(12) United States Patent
Shouldice et al.

(10) Patent No.: US 12,514,467 B2
(45) Date of Patent: Jan. 6, 2026

(54) SYSTEMS AND METHODS FOR ANALYZING PHYSICAL FEATURES OF AN INDIVIDUAL

(71) Applicant: ResMed Sensor Technologies Limited, Dublin (IE)

(72) Inventors: Redmond Shouldice, Dublin (IE); Stephen McMahon, Dublin (IE)

(73) Assignee: RedMed Sensor Technologies, Dublin (IE)

( * ) Notice: Subject to any disclaimer, the term of this patent is extended or adjusted under 35 U.S.C. 154(b) by 383 days.

(21) Appl. No.: 17/997,294

(22) PCT Filed: Apr. 30, 2021

(86) PCT No.: PCT/IB2021/053603
§ 371 (c)(1),
(2) Date: Oct. 27, 2022

(87) PCT Pub. No.: WO2021/220230
PCT Pub. Date: Nov. 4, 2021

(65) Prior Publication Data
US 2023/0172486 A1    Jun. 8, 2023

Related U.S. Application Data

(60) Provisional application No. 63/018,449, filed on Apr. 30, 2020.

(51) Int. Cl.
*A61B 5/107* (2006.01)
*A61B 5/00* (2006.01)

(52) U.S. Cl.
CPC .......... *A61B 5/1076* (2013.01); *A61B 5/1079* (2013.01); *A61B 5/6898* (2013.01)

(58) Field of Classification Search
CPC ... A61B 5/1076; A61B 5/1079; A61B 5/6898; A61B 8/12; A61B 8/4209; A61B 8/4455; A61B 8/5207; A61B 8/4444
See application file for complete search history.

(56) References Cited

U.S. PATENT DOCUMENTS

| 7,285,093 B2 | 10/2007 | Anisimov et al. |
| 2005/0005935 A1 | 1/2005 | Gradon |

(Continued)

FOREIGN PATENT DOCUMENTS

| JP | 2005058989 A | 3/2005 |
| JP | 2013252428 A | 12/2013 |

(Continued)

OTHER PUBLICATIONS

International Search Report in International Patent Application No. PCT/IB2021/053603, mailed Aug. 19, 2021 (7 pp.).

(Continued)

*Primary Examiner* — Kaitlyn E Sebastian
(74) *Attorney, Agent, or Firm* — Nixon Peabody LLP

(57) ABSTRACT

A method for analyzing physical features of an individual comprises directing an acoustic signal toward a mouth of the individual, receiving a reflected acoustic signal from the interior of the mouth of the individual, generating a structural profile of at least the interior of the mouth of the individual based at least in part on the reflected acoustic signal, and causing an action to be performed in response to generating the structural profile. The acoustic signal is configured to reflect off at least a portion of the interior of the mouth of the individual. The reflected acoustic signal is indicative of structural characteristics of the mouth of the individual. The structural profile can also be based on image data associated with the exterior of the head and neck of the individual, and image data associated with the interior of the mouth of the individual.

20 Claims, 15 Drawing Sheets

(56) References Cited

U.S. PATENT DOCUMENTS

| | | | |
|---|---|---|---|
| 2012/0234331 A1* | 9/2012 | Shantha | A61F 5/566 |
| | | | 128/848 |
| 2012/0244489 A1 | 9/2012 | Carnahan | |
| 2013/0060144 A1 | 3/2013 | Culjat et al. | |
| 2013/0330684 A1* | 12/2013 | Dillon | A61B 1/00042 |
| | | | 433/29 |
| 2014/0088373 A1 | 3/2014 | Phillips et al. | |
| 2015/0148664 A1* | 5/2015 | Stolka | A61B 34/20 |
| | | | 600/440 |
| 2015/0313572 A1 | 11/2015 | Gerbaulet et al. | |
| 2018/0078199 A1* | 3/2018 | Sankari | A61B 5/316 |
| 2018/0125610 A1* | 5/2018 | Carrier, Jr. | H04N 5/272 |

FOREIGN PATENT DOCUMENTS

| | | |
|---|---|---|
| JP | 2013543741 A | 12/2013 |
| JP | 2020058710 A | 4/2020 |
| WO | 2008/138040 A1 | 11/2008 |
| WO | 2012/012835 A2 | 2/2012 |
| WO | 2014/047310 A1 | 3/2014 |
| WO | 2016/061629 A1 | 4/2016 |
| WO | 2017/132726 A1 | 8/2017 |
| WO | 2018/050913 A1 | 3/2018 |
| WO | 2019/122413 A1 | 6/2019 |
| WO | 2019/122414 A1 | 6/2019 |
| WO | 2019147793 A1 | 8/2019 |
| WO | 2020/104465 A2 | 5/2020 |

OTHER PUBLICATIONS

International Search Report in International Patent Application No. PCT/IB2021/053603, mailed Aug. 19, 2021 (9 pp.).

* cited by examiner

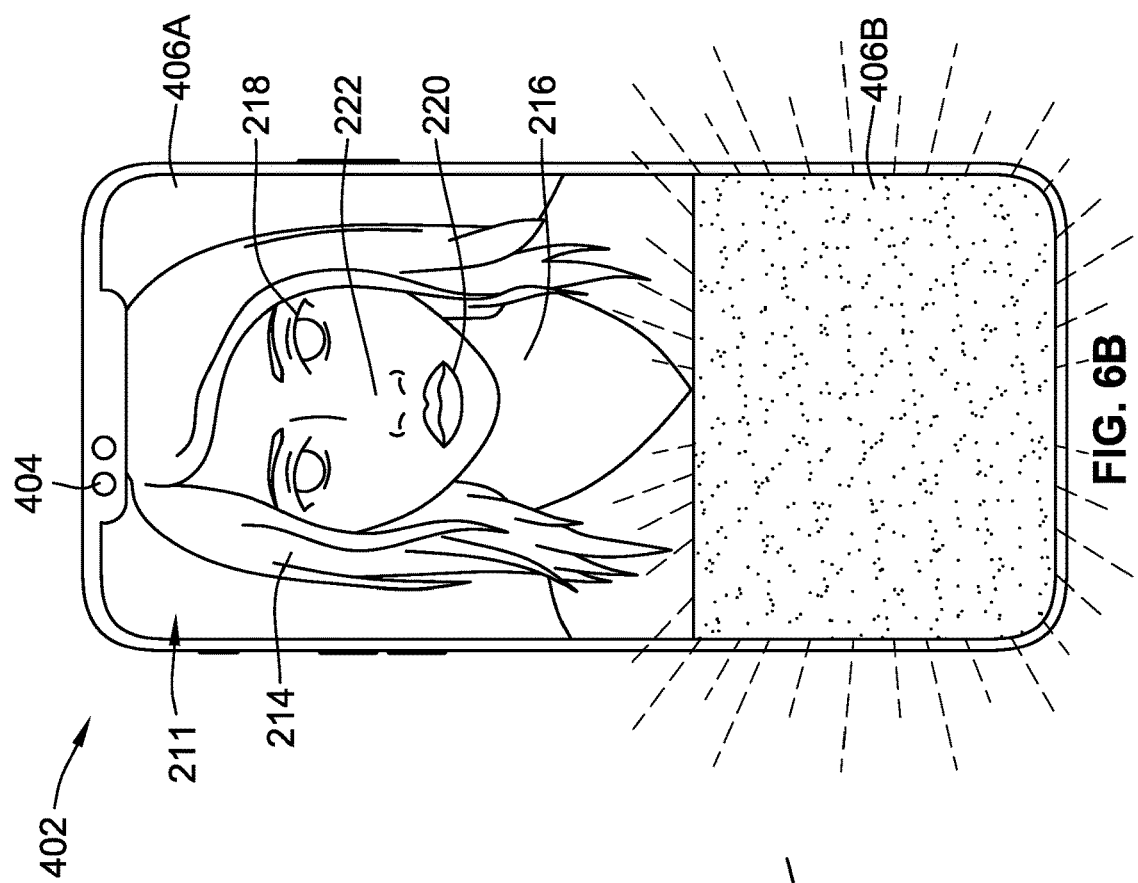
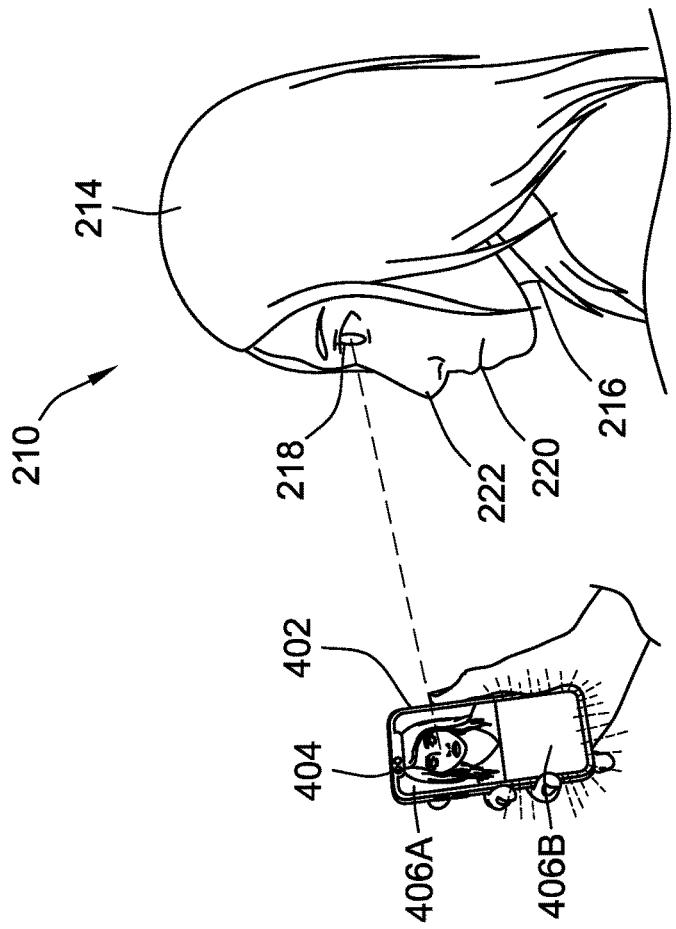
FIG. 6A
FIG. 6B

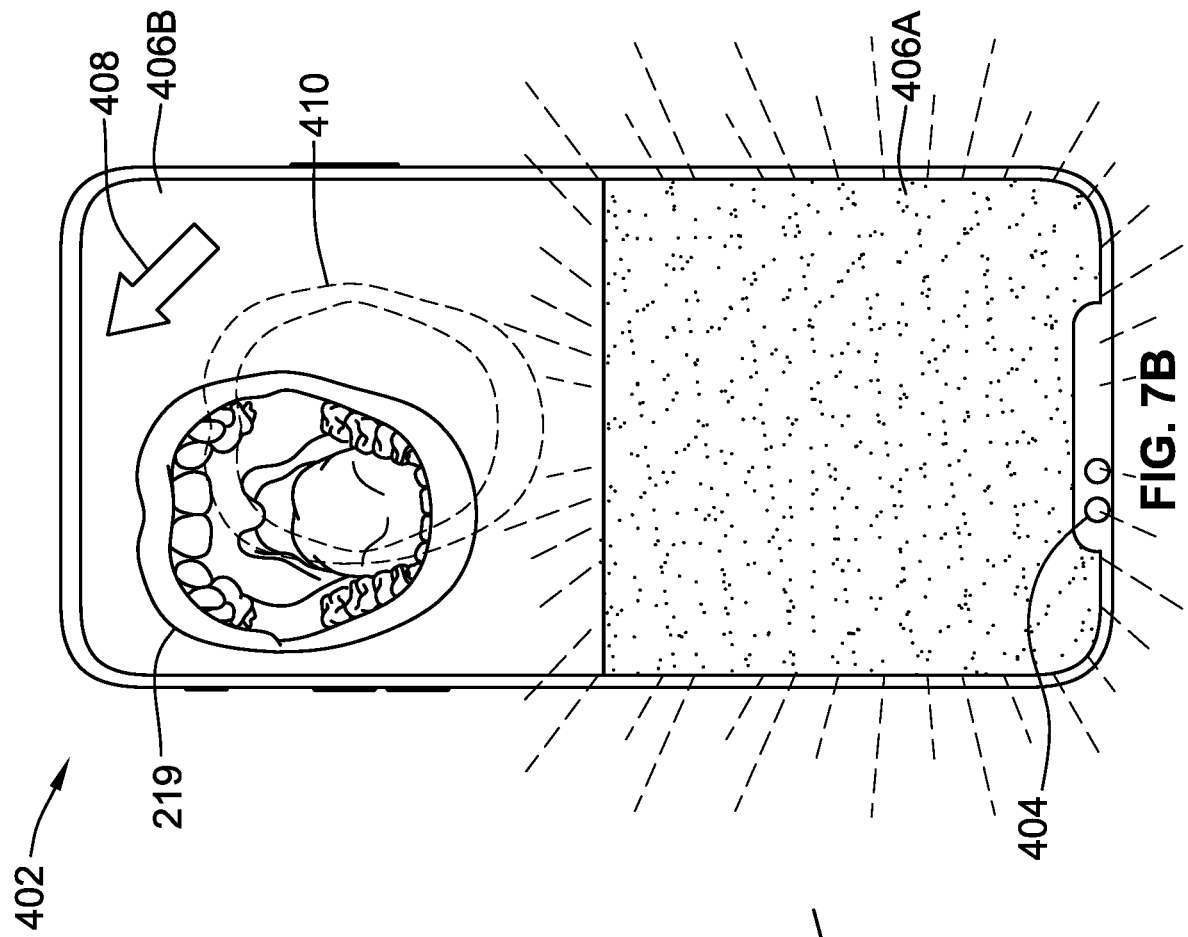
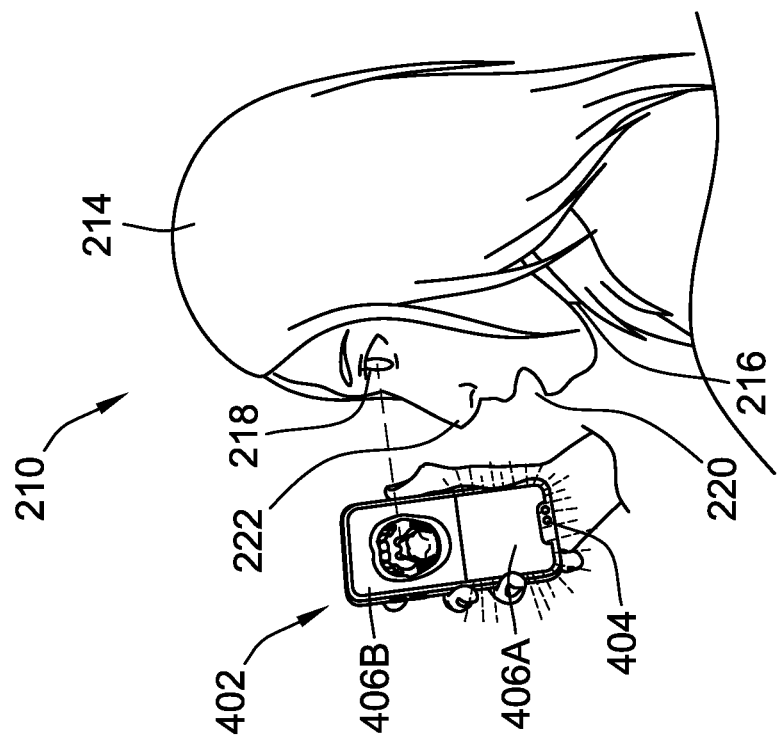
FIG. 7A
FIG. 7B

SYSTEMS AND METHODS FOR ANALYZING PHYSICAL FEATURES OF AN INDIVIDUAL

CROSS-REFERENCE TO RELATED APPLICATIONS

This application is a U.S. National Stage of International Application No. PCT/IB2021/053603, filed on Apr. 30, 2021, which claims the benefit of, and priority to, U.S. Provisional Patent Application No. 63/018,449, filed on Apr. 30, 2020, each of which is hereby incorporated by reference herein in its entirety.

TECHNICAL FIELD

The present disclosure relates generally to systems and methods for analyzing physical features of a user, and more particularly, to systems and methods for generating a structural profile of a user's head, neck, and mouth in order to determine a risk factor associated with developing sleep-disordered breathing.

BACKGROUND

Many individuals suffer from sleep-related and/or respiratory disorders such as, for example, Periodic Limb Movement Disorder (PLMD), Restless Leg Syndrome (RLS), Sleep-Disordered Breathing (SDB), Obstructive Sleep Apnea (OSA), Respiratory Effort Related Arousal (RERA), Central Sleep Apnea (CSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD), rapid eye movement (REM) behavior disorder (also referred to as RBD), dream enactment behavior (DEB), insomnia, and chest wall disorders. Individuals with certain physical features related to their head and neck are often at increased risk for developing these disorders, including SBD and OSA. However, it can be difficult to measure and track these features over long periods of time, and for most individuals, it can be difficult to determine how these physical features related to their risk for developing these disorders. Thus, it would be advantageous to be able to accurately monitor physical features of the individual and determine the individual's risk in developing any of these disorders. The present disclosure is directed to systems, devices, and methods to allow for easier tracking of the individual's physical features, and for the determination of a risk for developing any of these disorders or others, based on the physical features.

SUMMARY

According to some implementations of the present disclosure, a method of analyzing physical features of an individual comprises directing, using an acoustic sensor, an acoustic signal toward a mouth of the individual, the acoustic signal being configured to reflect off at least a portion of an interior of the mouth of the individual; receiving, using the acoustic sensor, a reflected acoustic signal from the interior of the mouth of the individual, the reflected acoustic signal being indicative of structural characteristics of the mouth of the individual; based at least in part on the reflected acoustic signal, generating a structural profile of at least the interior of the mouth of the individual; and in response to generating the structural profile, causing an action to be performed.

According to some implementations of the present disclosure, a device for positioning a handheld device adjacent to a mouth of an individual comprises a mouth portion configured to be at least partially inserted into the mouth of the individual; a handheld device portion configured to securely receive at least a portion of the handheld device therein such that an acoustic sensor of the handheld device is in fluid communication with an interior of the mouth of the individual when the mouth portion is at least partially inserted into the mouth of the individual.

According to some implementations of the present disclosure, a system for analyzing physical features of an individual comprises a handheld device including an acoustic sensor, and a device configured to be inserted into a mouth of the user. The device includes a mouth portion and a handheld device portion. The mouth portion is configured to be at least partially inserted into the mouth of the individual. The handheld device portion is configured to securely receive the handheld device, such that the acoustic sensor of the handheld device is in fluid communication with an interior of the mouth of the individual when the mouth portion of the device is at least partially inserted into the mouth of the individual. The handheld device is configured to implement a method. The method includes directing, using the acoustic sensor, an acoustic signal toward the mouth of the individual. The acoustic signal is configured to reflect off at least a portion of the interior of the mouth of the individual. The method further includes receiving, using the acoustic sensor, a reflected acoustic signal from the interior of the mouth of the individual. The reflected acoustic signal is indicative of structural characteristics of the mouth of the individual. The method further includes, generating, based at least in part on the reflected acoustic signal, a structural profile of at least the interior of the mouth of the individual. The method further includes, in response to generating the structural profile, causing an action to be performed.

The above summary is not intended to represent each implementation or every aspect of the present disclosure. Additional features and benefits of the present disclosure are apparent from the detailed description and figures set forth below.

BRIEF DESCRIPTION OF THE DRAWINGS

FIG. 6A is a perspective view of a user holding a smart phone to generate image data associated with the user's head and/or neck;

FIG. 6B is a view of a display of the smart phone of FIG. 6A when the user holds the smart phone in the position shown in FIG. 6A;

FIG. 7A is a perspective view of a user holding a smart phone to generate image data associated with the interior of the user's mouth;

FIG. 7B is a view of a display of the smart phone of FIG. 7A when the user holds the smart phone in the position shown in FIG. 7A;

Figure 1:
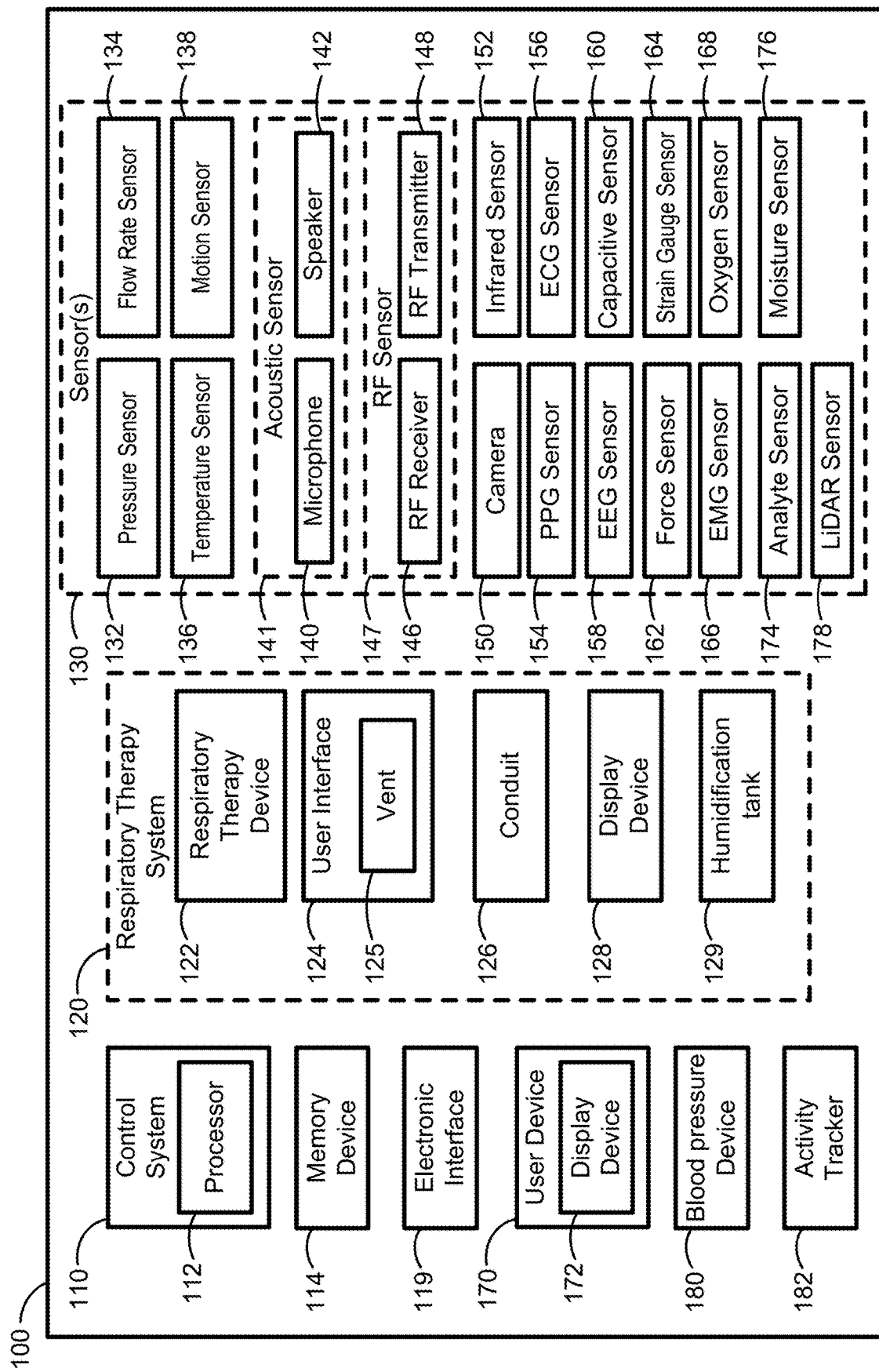
FIG. 1 is a functional block diagram of a system for monitoring a sleep session, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

Many individuals suffer from sleep-related and/or respiratory disorders such as, for example, Periodic Limb Movement Disorder (PLMD), Restless Leg Syndrome (RLS), Sleep-Disordered Breathing (SDB), Obstructive Sleep Apnea (OSA), Respiratory Effort Related Arousal (RERA), Central Sleep Apnea (CSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD), rapid eye movement (REM) behavior disorder (also referred to as RBD), dream enactment behavior (DEB), insomnia, and chest wall disorders.

Obstructive Sleep Apnea (OSA) is a form of Sleep Disordered Breathing (SDB), and is characterized by events including occlusion or obstruction of the upper air passage during sleep resulting from a combination of an abnormally small upper airway and the normal loss of muscle tone in the region of the tongue, soft palate and posterior oropharyngeal wall.

Central Sleep Apnea (CSA) is another form of SDB that results when the brain temporarily stops sending signals to the muscles that control breathing. More generally, an apnea generally refers to the cessation of breathing caused by blockage of the air or the stopping of the breathing function. Typically, the individual will stop breathing for between about 15 seconds and about 30 seconds during an obstructive sleep apnea event. Mixed sleep apnea is another form of SDB that is a combination of OSA and CSA.

Other types of apneas include hypopnea, hyperpnea, and hypercapnia. Hypopnea is generally characterized by slow or shallow breathing caused by a narrowed airway, as opposed to a blocked airway. Hyperpnea is generally characterized by an increase depth and/or rate of breathing. Hypercapnia is generally characterized by elevated or excessive carbon dioxide in the bloodstream, typically caused by inadequate respiration.

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterized by repetitive de-oxygenation and re-oxygenation of the arterial blood.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common, such as increased resistance to air movement, extended expiratory phase of respiration, and loss of the normal elasticity of the lung.

Neuromuscular Disease (NMD) encompasses many diseases and ailments that impair the functioning of the muscles either directly via intrinsic muscle pathology, or indirectly via nerve pathology. Chest wall disorders are a group of thoracic deformities that result in inefficient coupling between the respiratory muscles and the thoracic cage.

A Respiratory Effort Related Arousal (RERA) event is typically characterized by an increased respiratory effort for ten seconds or longer leading to arousal from sleep and which does not fulfill the criteria for an apnea or hypopnea event. RERAs are defined as a sequence of breaths characterized by increasing respiratory effort leading to an arousal from sleep, but which does not meet criteria for an apnea or hypopnea. These events must fulfil both of the following criteria: (1) a pattern of progressively more negative esophageal pressure, terminated by a sudden change in pressure to a less negative level and an arousal, and (2) the event lasts ten seconds or longer. In some implementations, a Nasal Cannula/Pressure Transducer System is adequate and reliable in the detection of RERAs. A RERA detector may be based on a real flow signal derived from a respiratory therapy device. For example, a flow limitation measure may be determined based on a flow signal. A measure of arousal may then be derived as a function of the flow limitation measure and a measure of sudden increase in ventilation. One such method is described in WO 2008/138040, assigned to ResMed Ltd., the disclosure of which is hereby incorporated by reference herein in its entirety.

RBD is a disorder characterized by a lack of muscle atonia during REM sleep stages, and in more severe cases, movement and speech produced by the individual during REM sleep stages. RBD can sometimes be accompanied by DEB, where the individual acts out a dream they may be having, sometimes resulting in injuries to themselves or their partners.

These and other disorders are characterized by particular events (e.g., snoring, an apnea, a hypopnea, a restless leg, a sleeping disorder, choking, an increased heart rate, labored breathing, an asthma attack, an epileptic episode, a seizure, or any combination thereof) that occur when the individual is sleeping.

The Apnea-Hypopnea Index (AHI) is an index used to indicate the severity of sleep apnea during a sleep session. The AHI is calculated by dividing the number of apnea and/or hypopnea events experienced by the user during the sleep session by the total number of hours of sleep in the sleep session. The event can be, for example, a pause in breathing that lasts for at least 10 seconds. An AHI that is less than 5 is considered normal. An AHI that is greater than or equal to 5, but less than 15 is considered indicative of mild sleep apnea. An AHI that is greater than or equal to 15, but less than 30 is considered indicative of moderate sleep apnea. An AHI that is greater than or equal to 30 is considered indicative of severe sleep apnea. In children, an AHI that is greater than 1 is considered abnormal. Sleep apnea can be considered "controlled" when the AHI is normal, or when the AHI is normal or mild. The AHI can also be used in combination with oxygen desaturation levels to indicate the severity of Obstructive Sleep Apnea.

A wide variety of types of data can be used to monitor the health of individuals having any of the above types of sleep-related and/or respiratory disorders (or other disorders). However, it is often difficult to collect accurate data in a manner that does not interrupt or disturb the user's sleep, or interfere with any treatment the user may be undergoing during sleep. Thus, it is advantageous to utilize a system for treatment that includes various sensors to generate and collect data, without disturbing the user, the user's sleep, or the user's treatment.

Referring to FIG. 1, a system 100, according to some implementations of the present disclosure, is illustrated. The system 100 can be used to analyze physical features of a user, in order to determine the individual's risk in developing sleep-related and/or respiratory-related disorders, including those discussed herein. The system 100 includes a control system 110, a memory device 114, an electronic interface 119, one or more sensors 130, and one or more user devices 170. In some implementations, the system 100 further optionally includes a respiratory therapy system 120 (that includes a respiratory therapy device 122), a blood pressure device 180, an activity tracker 182, or any combination thereof.

The control system 110 includes one or more processors 112 (hereinafter, processor 112). The control system 110 is generally used to control (e.g., actuate) the various components of the system 100 and/or analyze data obtained and/or generated by the components of the system 100. The processor 112 can be a general or special purpose processor or microprocessor. While one processor 112 is shown in FIG. 1, the control system 110 can include any suitable number of processors (e.g., one processor, two processors, five processors, ten processors, etc.) that can be in a single housing, or located remotely from each other. The control system 110 (or any other control system) or a portion of the control system 110 such as the processor 112 (or any other processor(s) or portion(s) of any other control system), can be used to carry out one or more steps of any of the methods described and/or claimed herein. The control system 110 can be coupled to and/or positioned within, for example, a housing of the user device 170, and/or within a housing of one or more of the sensors 130. The control system 110 can be centralized (within one such housing) or decentralized (within two or more of such housings, which are physically distinct). In such implementations including two or more housings containing the control system 110, such housings can be located proximately and/or remotely from each other.

The memory device 114 stores machine-readable instructions that are executable by the processor 112 of the control system 110. The memory device 114 can be any suitable computer readable storage device or media, such as, for example, a random or serial access memory device, a hard drive, a solid state drive, a flash memory device, etc. While one memory device 114 is shown in FIG. 1, the system 100 can include any suitable number of memory devices 114 (e.g., one memory device, two memory devices, five memory devices, ten memory devices, etc.). The memory device 114 can be coupled to and/or positioned within a housing of the respiratory therapy device 122, within a housing of the user device 170, within a housing of one or more of the sensors 130, or any combination thereof. Like the control system 110, the memory device 114 can be centralized (within one such housing) or decentralized (within two or more of such housings, which are physically distinct).

In some implementations, the memory device 114 stores a user profile associated with a user. The user profile can include, for example, demographic information associated with the user, biometric information associated with the user, medical information associated with the user, self-reported user feedback, sleep parameters associated with the user (e.g., sleep-related parameters recorded from one or more earlier sleep sessions), or any combination thereof. The demographic information can include, for example, information indicative of an age of the user, a gender of the user, a race of the user, a geographic location of the user, a relationship status, a family history (such as a family medical history of a sleep-related and/or respiratory-related disorder), an employment status of the user, an educational status of the user, a socioeconomic status of the user, or any combination thereof. The medical information can include, for example, information indicative of one or more medical conditions associated with the user, medication usage by the user, or both. The medical information data can further include a multiple sleep latency test (MSLT) result or score and/or a Pittsburgh Sleep Quality Index (PSQI) score or value. The self-reported user feedback can include information indicative of a self-reported subjective sleep score (e.g., poor, average, excellent), a self-reported subjective stress level of the user, a self-reported subjective fatigue level of the user, a self-reported subjective health status of the user, a recent life event experienced by the user, or any combination thereof.

The electronic interface 119 is configured to receive data (e.g., physiological data and/or acoustic data) from the one or more sensors 130 such that the data can be stored in the memory device 114 and/or analyzed by the processor 112 of the control system 110. The electronic interface 119 can communicate with the one or more sensors 130 using a wired connection or a wireless connection (e.g., using an RF communication protocol, a WiFi communication protocol, a Bluetooth communication protocol, an IR communication protocol, over a cellular network, over any other optical communication protocol, etc.). The electronic interface 119 can include an antenna, a receiver (e.g., an RF receiver), a transmitter (e.g., an RF transmitter), a transceiver, or any combination thereof. The electronic interface 119 can also include one more processors and/or one more memory devices that are the same as, or similar to, the processor 112 and the memory device 114 described herein. In some implementations, the electronic interface 119 is coupled to or integrated into the user device 170. In other implementations, the electronic interface 119 is coupled to or integrated (e.g., in a housing) with the control system 110 and/or the memory device 114.

As noted above, in some implementations, the system 100 optionally includes a respiratory therapy system 120 (also referred to as a respiratory pressure therapy system). The respiratory therapy system 120 can include a respiratory therapy device 122 (also referred to as a respiratory pressure therapy device), a user interface 124, a conduit 126 (also referred to as a tube or an air circuit), a display device 128, a humidification tank 129, or any combination thereof. In some implementations, the control system 110, the memory device 114, the display device 128, one or more of the sensors 130, and the humidification tank 129 are part of the respiratory therapy device 122. Respiratory pressure therapy refers to the application of a supply of air to an entrance of the user's airways at a controlled target pressure that is nominally positive with respect to atmosphere throughout the user's breathing cycle (e.g., in contrast to negative pressure therapies such as the tank ventilator or cuirass). The respiratory therapy system 120 is generally used to treat individuals suffering from one or more sleep-related respiratory disorders (e.g., obstructive sleep apnea, central sleep apnea, or mixed sleep apnea), other respiratory disorders such as COPD, or other disorders leading to respiratory insufficiency, that may manifest either during sleep or wakefulness.

The respiratory therapy device 122 has a blower motor (not shown) that is generally used to generate pressurized air that is delivered to the user (e.g., using one or more motors that drive one or more compressors). In some implementations, the respiratory therapy device 122 generates continuous constant air pressure that is delivered to the user. In other implementations, the respiratory therapy device 122 generates two or more predetermined pressures (e.g., a first predetermined air pressure and a second predetermined air pressure). In still other implementations, the respiratory therapy device 122 is configured to generate a variety of different air pressures within a predetermined range. For example, the respiratory therapy device 122 can deliver at least about 6 cm $H_2O$, at least about 10 cm $H_2O$, at least about 20 cm $H_2O$, between about 6 cm $H_2O$ and about 10 cm $H_2O$, between about 7 cm $H_2O$ and about 12 cm $H_2O$, etc. The respiratory therapy device 122 can also deliver pressurized air at a predetermined flow rate between, for example, about −20 L/min and about 150 L/min, while maintaining a positive pressure (relative to the ambient pressure). In some implementations, the control system 110, the memory device 114, the electronic interface 119, or any combination thereof can be coupled to and/or positioned within a housing of the respiratory therapy device 122.

The user interface 124 engages a portion of the user's face and delivers pressurized air from the respiratory therapy device 122 to the user's airway to aid in preventing the airway from narrowing and/or collapsing during sleep. This may also increase the user's oxygen intake during sleep. Generally, the user interface 124 engages the user's face such that the pressurized air is delivered to the user's airway via the user's mouth, the user's nose, or both the user's mouth and nose. Together, the respiratory therapy device 122, the user interface 124, and the conduit 126 form an air pathway fluidly coupled with an airway of the user. The pressurized air also increases the user's oxygen intake during sleep. Depending upon the therapy to be applied, the user interface 124 may form a seal, for example, with a region or portion of the user's face, to facilitate the delivery of air at a pressure at sufficient variance with ambient pressure to effect therapy, for example, at a positive pressure of about 10 cm $H_2O$ relative to ambient pressure. For other forms of therapy, such as the delivery of oxygen, the user interface may not include a seal sufficient to facilitate delivery to the airways of a supply of gas at a positive pressure of about 10 cm $H_2O$.

Figure 2:
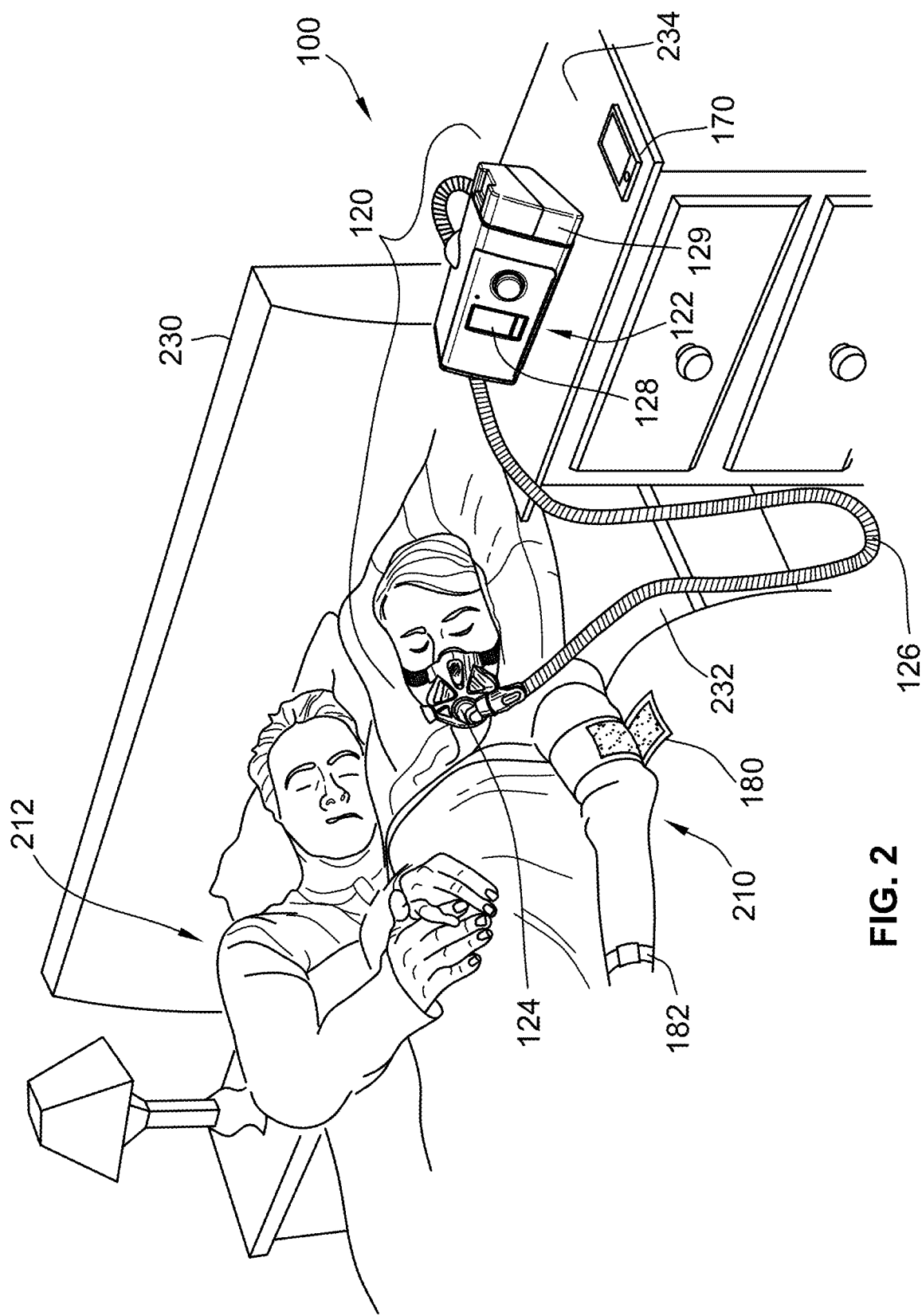
FIG. 2 is a perspective view of the system of FIG. 1, a user of the system, and a bed partner of the user, according to some implementations of the present disclosure.

As shown in FIG. 2, in some implementations, the user interface 124 is or includes a facial mask (e.g. a full facial mask) that covers the nose and mouth of the user 210. Alternatively, the user interface 124 is or includes a nasal mask that provides air to the nose of the user 210 or a nasal pillow mask that delivers air directly to the nostrils of the user 210. The user interface 124 can include a strap assembly that has a plurality of straps (e.g., including hook and loop fasteners) for aiding in positioning and/or stabilizing the user interface 124 on a portion of the user 210 (e.g., the face) and a conformal cushion (e.g., silicone, plastic, foam, etc.) that aids in providing an air-tight seal between the user interface 124 and the user 210. In some implementations, the user interface 124 may include a connector 127 and one or more vents 125. The one or more vents 125 can be used to permit the escape of carbon dioxide and other gases exhaled by the user. In other implementations, the user interface 124 includes a mouthpiece (e.g., a night guard mouthpiece molded to conform to the user's teeth, a mandibular repositioning device, etc.). In some implementations, the connector 127 is distinct from, but couplable to, the user interface 124 (and/or conduit 126).

The conduit 126 (also referred to as an air circuit or tube) allows the flow of air between two components of the respiratory therapy system 120, such as the respiratory therapy device 122 and the user interface 124. In some implementations, there can be separate limbs of the conduit 126 for inhalation and exhalation. In other implementations, a single limb conduit is used for both inhalation and exhalation.

One or more of the respiratory therapy device 122, the user interface 124, the conduit 126, the display device 128, and the humidification tank 129 can contain one or more sensors (e.g., a pressure sensor, a flow rate sensor, or more generally any of the other sensors 130 described herein). These one or more sensors can be used, for example, to measure the air pressure and/or flow rate of pressurized air supplied by the respiratory therapy device 122.

The display device 128 is generally used to display image(s) including still images, video images, or both and/or information regarding the respiratory therapy device 122. For example, the display device 128 can provide information regarding the status of the respiratory therapy device 122 (e.g., whether the respiratory therapy device 122 is on/off, the pressure of the air being delivered by the respiratory therapy device 122, the temperature of the air being delivered by the respiratory therapy device 122, etc.) and/or other information (e.g., a sleep score and/or a therapy score, also referred to as a myAir™ score, such as described in WO 2016/061629, which is hereby incorporated by reference herein in its entirety; the current date/time; personal information for the user 210; etc.). In some implementations, the display device 128 acts as a human-machine interface (HMI) that includes a graphic user interface (GUI) configured to display the image(s) as an input interface. The display device 128 can be an LED display, an OLED display, an LCD display, or the like. The input interface can be, for example, a touchscreen or touch-sensitive substrate, a mouse, a keyboard, or any sensor system configured to sense inputs made by a human user interacting with the respiratory therapy device 122.

The humidification tank 129 is coupled to or integrated into the respiratory therapy device 122 and includes a reservoir of water that can be used to humidify the pressurized air delivered from the respiratory therapy device 122. The respiratory therapy device 122 can include one or more vents (not shown) and a heater to heat the water in the humidification tank 129 in order to humidify the pressurized air provided to the user 210. Additionally, in some implementations, the conduit 126 can also include a heating element (e.g., coupled to and/or imbedded in the conduit 126) that heats the pressurized air delivered to the user 210. The humidification tank 129 can be fluidly coupled to a water vapor inlet of the air pathway and deliver water vapor into the air pathway via the water vapor inlet, or can be formed in-line with the air pathway as part of the air pathway itself. In some implementations, the respiratory therapy device 122 and/or the conduit 126 can include a waterless humidifier. The waterless humidifier can incorporate sensors that interface with other sensors positioned elsewhere in the system 100.

The respiratory therapy system 120 can be used, for example, as a ventilator or as a positive airway pressure (PAP) system, such as a continuous positive airway pressure (CPAP) system, an automatic positive airway pressure system (APAP), a bi-level or variable positive airway pressure system (BPAP or VPAP), or any combination thereof. The CPAP system delivers air at a predetermined pressure (e.g., determined by a sleep physician) to the user 210. The APAP system automatically varies the air pressure delivered to the user 210 based at least in part on, for example, respiration data associated with the user 210. The BPAP or VPAP system is configured to deliver a first predetermined pressure (e.g., an inspiratory positive airway pressure or IPAP) and a second predetermined pressure (e.g., an expiratory positive airway pressure or EPAP) that is lower than the first predetermined pressure.

Referring again to FIG. 2, a portion of the system 100 (FIG. 1), according to some implementations, is illustrated. The user 210 of the respiratory therapy system 120 and a bed partner 212 are located on a bed 230 and laying on a mattress 232. The user interface 124 (also referred to herein as a mask, e.g., a full facial mask) can be worn by the user 210 during a sleep session. The user interface 124 is fluidly coupled and/or connected to the respiratory therapy device 122 via the conduit 126. In turn, the respiratory therapy device 122 delivers pressurized air to the user 210 via the conduit 126 and the user interface 124 to increase the air pressure in the throat of the user 210 to aid in preventing the airway from closing and/or narrowing during sleep. The respiratory therapy device 122 can include the display device 128, which can allow the user to interact with the respiratory therapy device 122. The respiratory therapy device 122 can also include the humidification tank 129, which stores the water used to humidify the pressurized air. The respiratory therapy device 122 can be positioned on a nightstand 234 that is directly adjacent to the bed 230 as shown in FIG. 2, or more generally, on any surface or structure that is generally adjacent to the bed 230 and/or the user 210. The user can also wear the blood pressure device 180 and the activity tracker 182 while lying on the mattress 232 in the bed 230.

Referring to back to FIG. 1, the one or more sensors 130 of the system 100 include a pressure sensor 132, a flow rate sensor 134, a temperature sensor 136, a motion sensor 138, a microphone 140, a speaker 142, a radio-frequency (RF) receiver 146, an RF transmitter 148, a camera 150, an infrared (IR) sensor 152, a photoplethysmogram (PPG) sensor 154, an electrocardiogram (ECG) sensor 156, an electroencephalography (EEG) sensor 158, a capacitive sensor 160, a force sensor 162, a strain gauge sensor 164, an electromyography (EMG) sensor 166, an oxygen sensor 168, an analyte sensor 174, a moisture sensor 176, a light detection and ranging (LiDAR) sensor 178, or any combination thereof. Generally, each of the one or more sensors 130 are configured to output sensor data that is received and stored in the memory device 114 or one or more other memory devices. The sensors 130 can also include an electrooculography (EOG) sensor, a peripheral oxygen saturation ($SpO_2$) sensor, a galvanic skin response (GSR) sensor, a carbon dioxide ($CO_2$) sensor, or any combination thereof.

While the one or more sensors 130 are shown and described as including each of the pressure sensor 132, the flow rate sensor 134, the temperature sensor 136, the motion sensor 138, the microphone 140, the speaker 142, the RF receiver 146, the RF transmitter 148, the camera 150, the IR sensor 152, the PPG sensor 154, the ECG sensor 156, the EEG sensor 158, the capacitive sensor 160, the force sensor 162, the strain gauge sensor 164, the EMG sensor 166, the oxygen sensor 168, the analyte sensor 174, the moisture sensor 176, and the LiDAR sensor 178, more generally, the one or more sensors 130 can include any combination and any number of each of the sensors described and/or shown herein.

The one or more sensors 130 can be used to generate, for example, physiological data, acoustic data, or both, that is associated with a user of the respiratory therapy system 120 (such as user 210 of FIG. 2), the respiratory therapy system 120, both the user and the respiratory therapy system 120, or other entities, objects, activities, etc. Physiological data generated by one or more of the sensors 130 can be used by the control system 110 to determine a sleep-wake signal associated with the user 210 during the sleep session and one or more sleep-related parameters. The sleep-wake signal can be indicative of one or more sleep stages and/or sleep states (which can be used interchangeably herein), including wakefulness, relaxed wakefulness, micro-awakenings, or distinct sleep stages such as, for example, a rapid eye movement (REM) stage (which can include both a typical REM stage and an atypical REM stage), a first non-REM stage (often referred to as "N1"), a second non-REM stage (often referred to as "N2"), a third non-REM stage (often referred to as "N3"), or any combination thereof. Methods for determining sleep stages and/or sleep stages from physiological data generated by one or more sensors, such as the one or more sensors 130, are described in, for example, WO 2014/047310, US 2014/0088373, WO 2017/132726, WO 2019/122413, and WO 2019/122414, each of which is hereby incorporated by reference herein in its entirety.

In some implementations, the sleep-wake signal described herein can be timestamped to indicate a time that the user enters the bed, a time that the user exits the bed, a time that the user attempts to fall asleep, etc. The sleep-wake signal can be measured by the one or more sensors 130 during the sleep session at a predetermined sampling rate, such as, for example, one sample per second, one sample per 30 seconds, one sample per minute, etc. In some implementations, the sleep-wake signal can also be indicative of a respiration signal, a respiration rate, an inspiration amplitude, an expiration amplitude, an inspiration-expiration ratio, a number of events per hour, a pattern of events, pressure settings of the respiratory therapy device 122, or any combination thereof during the sleep session. The event(s) can include snoring, apneas, central apneas, obstructive apneas, mixed apneas, hypopneas, a mask leak (e.g., from the user interface 124), a restless leg, a sleeping disorder, choking, an increased heart rate, labored breathing, an asthma attack, an epileptic episode, a seizure, a fever, a cough, a sneeze, a snore, a gasp, the presence of an illness such as the common cold or the flu, an elevated stress level, or any combination thereof. The one or more sleep-related parameters that can be determined for the user during the sleep session based on the sleep-wake signal include, for example, a total time in bed, a total sleep time, a sleep onset latency, a wake-after-sleep-onset parameter, a sleep efficiency, a fragmentation index, or any combination thereof. As described in further detail herein, the physiological data and/or the sleep-related parameters can be analyzed to determine one or more sleep-related scores.

Physiological data and/or acoustic data generated by the one or more sensors 130 can also be used to determine a respiration signal associated with a user during a sleep session. The respiration signal is generally indicative of respiration or breathing of the user during the sleep session. Other sleep-related parameters (or other parameters or measurements in general) can be determined from the physiological data and/or the acoustic data, and in some implementations can be determined from the respiration signal itself. The sleep-related parameters that can be determined for the user 210 during the sleep session can include, for example, the respiration signal, the Apnea-Hypopnea Index (AHI) score, a sleep score, a flow signal, a respiration rate, a respiration rate variability, an inspiration amplitude, an expiration amplitude, an inspiration-expiration ratio, an occurrence of one or more events, a number of events per hour, a pattern of events, a sleep stage (also referred to as a sleep state), pressure settings of the respiratory therapy device 122, a heart rate, a heart rate variability, movement of the user 210, temperature, EEG activity, EMG activity, arousal, snoring, choking, coughing, whistling, wheezing, or any combination thereof. The one or more events can include snoring, apneas, central apneas, obstructive apneas, mixed apneas, hypopneas, an intentional mask leak (e.g., from the user interface 124), an unintentional mask leak, a mouth leak, a cough, a restless leg, a sleeping disorder, choking, an increased heart rate, labored breathing, an asthma attack, an epileptic episode, a seizure, increased blood pressure, or any combination thereof. Many of the described sleep-related parameters are physiological parameters, although some of the sleep-related parameters can be considered to be non-physiological parameters. Other types of physiological and/or non-physiological parameters can also be determined, either from the data from the one or more sensors 130, or from other types of data.

The pressure sensor 132 outputs pressure data that can be stored in the memory device 114 and/or analyzed by the processor 112 of the control system 110. In some implementations, the pressure sensor 132 is an air pressure sensor (e.g., barometric pressure sensor) that generates sensor data indicative of the respiration (e.g., inhaling and/or exhaling) of the user of the respiratory therapy system 120 and/or ambient pressure. In such implementations, the pressure sensor 132 can be coupled to or integrated into the respiratory therapy device 122. The pressure sensor 132 can be, for example, a capacitive sensor, an inductive sensor, a resistive sensor, an electromagnetic sensor, a piezoelectric sensor, a strain-gauge sensor, an optical sensor, a potentiometric sensor, or any combination thereof. In some implementations, the pressure sensor 132 can be used to determine a blood pressure of the user.

The flow rate sensor 134 outputs flow rate data that can be stored in the memory device 114 and/or analyzed by the processor 112 of the control system 110. Examples of flow rate sensors (such as, for example, the flow rate sensor 134) are described in International Publication No. WO 2012/012835, which is hereby incorporated by reference herein in its entirety. In some implementations, the flow rate sensor 134 is used to determine an air flow rate from the respiratory therapy device 122, an air flow rate through the conduit 126, an air flow rate through the user interface 124, or any combination thereof. In such implementations, the flow rate sensor 134 can be coupled to or integrated into the respiratory therapy device 122, the user interface 124, or the conduit 126. The flow rate sensor 134 can be a mass flow rate sensor such as, for example, a rotary flow meter (e.g., Hall effect flow meters), a turbine flow meter, an orifice flow meter, an ultrasonic flow meter, a hot wire sensor, a vortex sensor, a membrane sensor, or any combination thereof. In some implementations, the flow rate sensor 134 is configured to measure a vent flow (e.g., intentional "leak"), an unintentional leak (e.g., mouth leak and/or mask leak), a patient flow (e.g., air into and/or out of lungs), or any combination thereof. In some implementations, the flow rate data can be analyzed to determine cardiogenic oscillations of the user. In one example, the pressure sensor 132 can be used to determine a blood pressure of a user.

The temperature sensor 136 outputs temperature data that can be stored in the memory device 114 and/or analyzed by the processor 112 of the control system 110. In some implementations, the temperature sensor 136 generates temperatures data indicative of a core body temperature of the user 210 (FIG. 2), a skin temperature of the user 210, a temperature of the air flowing from the respiratory therapy device 122 and/or through the conduit 126, a temperature in the user interface 124, an ambient temperature, or any combination thereof. The temperature sensor 136 can be, for example, a thermocouple sensor, a thermistor sensor, a silicon band gap temperature sensor or semiconductor-based sensor, a resistance temperature detector, or any combination thereof.

The motion sensor 138 outputs motion data that can be stored in the memory device 114 and/or analyzed by the processor 112 of the control system 110. The motion sensor 138 can be used to detect movement of the user 210 during the sleep session, and/or detect movement of any of the components of the respiratory therapy system 120, such as the respiratory therapy device 122, the user interface 124, or the conduit 126. The motion sensor 138 can include one or more inertial sensors, such as accelerometers, gyroscopes, and magnetometers. In some implementations, the motion sensor 138 alternatively or additionally generates one or more signals representing bodily movement of the user, from which may be obtained a signal representing a sleep state of the user; for example, via a respiratory movement of the user. In some implementations, the motion data from the motion sensor 138 can be used in conjunction with additional data from another sensor 130 to determine the sleep stage of the user. The motion sensor 138 can be used to detect motion or acceleration associated with arterial pulses, such as pulses in or around the face of the user and proximal to the user interface 124, and configured to detect features of the pulse shape, speed, amplitude, or volume.

The microphone 140 outputs acoustic data that can be stored in the memory device 114 and/or analyzed by the processor 112 of the control system 110. The acoustic data generated by the microphone 140 is reproducible as one or more sound(s) during a sleep session (e.g., sounds from the user) to determine (e.g., using the control system 110) one or more sleep-related parameters, as described in further detail herein. The acoustic data from the microphone 140 can also be used to identify (e.g., using the control system 110) an event experienced by the user during the sleep session, as described in further detail herein. In other implementations, the acoustic data from the microphone 140 is representative of noise associated with the respiratory therapy system 120. In some implementations, the system 100 includes a plurality of microphones (e.g., two or more microphones and/or an array of microphones with beamforming) such that sound data generated by each of the plurality of microphones can be used to discriminate the sound data generated by another of the plurality of microphones. The microphone 140 can be coupled to or integrated into the respiratory therapy system 120 (or the system 100) generally in any configuration. For example, the microphone 140 can be disposed inside the respiratory therapy device 122, the user interface 124, the conduit 126, or other components. The microphone 140 can also be positioned adjacent to or coupled to the outside of the respiratory therapy device 122, the outside of the user interface 124, the outside of the conduit 126, or outside of any other components. The microphone 140 could also be a component of the user device 170 (e.g., the microphone 140 is a microphone of a smart phone). The microphone 140 can be integrated into the user interface 124, the conduit 126, the respiratory therapy device 122, or any combination thereof. In general, the microphone 140 can be located at any point within or adjacent to the air pathway of the respiratory therapy system 120, which includes at least the motor of the respiratory therapy device 122, the user interface 124, and the conduit 126. Thus, the air pathway can also be referred to as the acoustic pathway.

The speaker 142 outputs sound waves that are audible to a user of the system 100 (e.g., the user 210 of FIG. 2). The speaker 142 can be used, for example, as an alarm clock or to play an alert or message to the user 210 (e.g., in response to an event). In some implementations, the speaker 142 can be used to communicate the acoustic data generated by the microphone 140 to the user. The speaker 142 can be coupled to or integrated into the respiratory therapy device 122, the user interface 124, the conduit 126, or the user device 170. In some implementations, the speaker 142 is a bone conduction speaker.

The microphone 140 and the speaker 142 can be used as separate devices. In some implementations, the microphone 140 and the speaker 142 can be combined into an acoustic sensor 141 (e.g., a SONAR sensor), as described in, for example, WO 2018/050913 and WO 2020/104465, each of which is hereby incorporated by reference herein in its entirety. In such implementations, the speaker 142 generates or emits sound waves at a predetermined interval and/or frequency, and the microphone 140 detects the reflections of the emitted sound waves from the speaker 142. The sound waves generated or emitted by the speaker 142 have a frequency that is not audible to the human ear (e.g., below 20 Hz or above around 18 kHz) so as not to disturb the sleep of the user 210 or the bed partner 212 (FIG. 2). Based at least in part on the data from the microphone 140 and/or the speaker 142, the control system 110 can determine a location of the user 210 (FIG. 2) and/or one or more of the sleep-related parameters described in herein such as, for example, a respiration signal, a respiration rate, an inspiration amplitude, an expiration amplitude, an inspiration-expiration ratio, a number of events per hour, a pattern of events, a sleep state, a sleep stage, pressure settings of the respiratory therapy device 122, or any combination thereof. In this context, a SONAR sensor may be understood to concern an active acoustic sensing, such as by generating and/or transmitting ultrasound and/or low frequency ultrasound sensing signals (e.g., in a frequency range of about 17-23 kHz, 18-22 kHz, or 17-18 kHz, for example), through the air. Such a system may be considered in relation to WO 2018/050913 and WO 2020/104465 mentioned above, each of which is hereby incorporated by reference herein in its entirety.

In some implementations, the one or more sensors 130 include (i) a first microphone that is the same as, or similar to, the microphone 140, and is integrated into the acoustic sensor 141 and (ii) a second microphone that is the same as, or similar to, the microphone 140, but is separate and distinct from the first microphone that is integrated into the acoustic sensor 141.

The RF transmitter 148 generates and/or emits radio waves having a predetermined frequency and/or a predetermined amplitude (e.g., within a high frequency band, within a low frequency band, long wave signals, short wave signals, etc.). The RF receiver 146 detects the reflections of the radio waves emitted from the RF transmitter 148, and this data can be analyzed by the control system 110 to determine a location of the user 210 (FIG. 2) and/or one or more of the sleep-related parameters described herein. An RF receiver (either the RF receiver 146 and the RF transmitter 148 or another RF pair) can also be used for wireless communication between the control system 110, the respiratory therapy device 122, the one or more sensors 130, the user device 170, or any combination thereof. While the RF receiver 146 and RF transmitter 148 are shown as being separate and distinct elements in FIG. 1, in some implementations, the RF receiver 146 and RF transmitter 148 are combined as a part of an RF sensor 147 (e.g. a RADAR sensor). In some such implementations, the RF sensor 147 includes a control circuit. The specific format of the RF communication could be Wi-Fi, Bluetooth, or the like.

In some implementations, the RF sensor 147 is a part of a mesh system. One example of a mesh system is a Wi-Fi mesh system, which can include mesh nodes, mesh router(s), and mesh gateway(s), each of which can be mobile/movable or fixed. In such implementations, the Wi-Fi mesh system includes a Wi-Fi router and/or a Wi-Fi controller and one or more satellites (e.g., access points), each of which include an RF sensor that the is the same as, or similar to, the RF sensor 147. The Wi-Fi router and satellites continuously communicate with one another using Wi-Fi signals. The Wi-Fi mesh system can be used to generate motion data based at least in part on changes in the Wi-Fi signals (e.g., differences in received signal strength) between the router and the satellite(s) due to an object or person moving partially obstructing the signals. The motion data can be indicative of motion, breathing, heart rate, gait, falls, behavior, etc., or any combination thereof.

The camera 150 outputs image data reproducible as one or more images (e.g., still images, video images, thermal images, or any combination thereof) that can be stored in the memory device 114. The image data from the camera 150 can be used by the control system 110 to determine one or more of the sleep-related parameters described herein, such as, for example, one or more events (e.g., periodic limb movement or restless leg syndrome), a respiration signal, a respiration rate, an inspiration amplitude, an expiration amplitude, an inspiration-expiration ratio, a number of events per hour, a pattern of events, a sleep state, a sleep stage, or any combination thereof. Further, the image data from the camera 150 can be used to, for example, identify a location of the user, to determine chest movement of the user 210 (FIG. 2), to determine air flow of the mouth and/or nose of the user 210, to determine a time when the user 210 enters the bed 230 (FIG. 2), and to determine a time when the user 210 exits the bed 230. In some implementations, the camera 150 includes a wide angle lens or a fish eye lens. The camera 150 can also be used to track eye movements, pupil dilation (if one or both of the user's eyes are open), blink rate, or any changes during REM sleep. The camera 150 can also be used to track the position of the user, which can impact the duration and/or severity of apneic episodes in users with positional obstructive sleep apnea. In some implementations, the camera 150 can detect visible radiation that may be emitted due to the swelling and/or redness of the user 210's tonsils and/or gums.

The IR sensor 152 outputs infrared image data reproducible as one or more infrared images (e.g., still images, video images, or both) that can be stored in the memory device 114. The IR sensor 152 can be a passive sensor or an active sensor. A passive IR sensor 152 can measure natural infrared emissions or reflections from distant surfaces, such as measuring IR energy radiating from a surface to determine the surface's temperature. An active IR sensor 152 can include an IR emitter that generates an IR signal, which is then received by an IR receiver. Such an active IR sensor 152 can be used to measure IR reflection off and/or transmission through an object. For example, an IR emitter that is a dot projector can project a recognizable array of dots onto a user's face using IR light, the reflections of which can then be detected by an IR receiver to determine ranging data (e.g., data associated with a distance between the IR sensor 152 and a distant surface, such as portion of the user's face) or contour data (e.g., data associated with relative heights features of a surface with respect to a nominal height of the surface) associated with the user's face.

The infrared data from the IR sensor 152 can be used to determine one or more physiological and/or sleep-related parameters during a sleep session, including a temperature of the user 210 and/or movement of the user 210. The IR sensor 152 can also be used in conjunction with the camera 150 when measuring the presence, location, and/or movement of the user 210, including movement associated with RBD or DEB. The IR sensor 152 can detect infrared light having a wavelength between about 700 nm and about 1 mm, for example, while the camera 150 can detect visible light having a wavelength between about 380 nm and about 740 nm. In some implementations, the IR sensor 152 can be used to detect localized temperatures at, near, or within the user's head, mouth, and/or neck. For example, inflammation in the user's mouth (such as swelling and/or redness of the user's tonsils and/or gums) can emit heat, which may be detected by the IR sensor 152. The IR sensor 152 can also be used in conjunction with the camera 150, such as to correlate IR data (e.g., temperature data or ranging data) with camera data (e.g., localized features or colors). Thus, the IR sensor 152 can be used as both a thermal sensor and a ranging sensor.

The PPG sensor 154 outputs physiological data associated with the user 210 (FIG. 2) that can be used to determine one or more sleep-related parameters, such as, for example, a heart rate, a heart rate pattern, a heart rate variability, a cardiac cycle, respiration rate, an inspiration amplitude, an expiration amplitude, an inspiration-expiration ratio, estimated blood pressure parameter(s), or any combination thereof. The PPG sensor 154 can be worn by the user 210, embedded in clothing and/or fabric that is worn by the user 210, embedded in and/or coupled to the user interface 124 and/or its associated headgear (e.g., straps, etc.), etc.

The ECG sensor 156 outputs physiological data associated with electrical activity of the heart of the user 210. In some implementations, the ECG sensor 156 includes one or more electrodes that are positioned on or around a portion of the user 210 during the sleep session. The physiological data from the ECG sensor 156 can be used, for example, to determine one or more of the sleep-related parameters described herein.

The EEG sensor 158 outputs physiological data associated with electrical activity of the brain of the user. In some implementations, the EEG sensor 158 includes one or more electrodes that are positioned on or around the scalp of the user during the sleep session. The physiological data from the EEG sensor 158 can be used, for example, to determine a sleep stage of the user at any given time during the sleep session. In some implementations, the EEG sensor 158 can be integrated into the user interface 124 and/or the associated headgear (e.g., straps, etc.).

The capacitive sensor 160, the force sensor 162, and the strain gauge sensor 164 output data that can be stored in the memory device 114 and used by the control system 110 to determine one or more of the sleep-related parameters described herein. The EMG sensor 166 outputs physiological data associated with electrical activity produced by one or more muscles. The oxygen sensor 168 outputs oxygen data indicative of an oxygen concentration of gas (e.g., in the conduit 126 or at the user interface 124). The oxygen sensor 168 can be, for example, an ultrasonic oxygen sensor, an electrical oxygen sensor, a chemical oxygen sensor, an optical oxygen sensor, a pulse oximeter (e.g., $SpO_2$ sensor), or any combination thereof. In some implementations, the one or more sensors 130 also include a galvanic skin response (GSR) sensor, a blood flow sensor, a respiration sensor, a pulse sensor, a sphygmomanometer sensor, an oximetry sensor, or any combination thereof.

The analyte sensor 174 can be used to detect the presence of an analyte in the exhaled breath of the user 210. The data output by the analyte sensor 174 can be stored in the memory device 114 and used by the control system 110 to determine the identity and concentration of any analytes in the user's breath. In some implementations, the analyte sensor 174 is positioned near a mouth of the user 210 to detect analytes in breath exhaled from the user 210's mouth. For example, when the user interface 124 is a facial mask that covers the nose and mouth of the user 210, the analyte sensor 174 can be positioned within the facial mask to monitor the user 210's mouth breathing. In other implementations, such as when the user interface 124 is a nasal mask or a nasal pillow mask, the analyte sensor 174 can be positioned near the nose of the user 210 to detect analytes in breath exhaled through the user's nose. In still other implementations, the analyte sensor 174 can be positioned near the user 210's mouth when the user interface 124 is a nasal mask or a nasal pillow mask. In this implementation, the analyte sensor 174 can be used to detect whether any air is inadvertently leaking from the user 210's mouth. In some implementations, the analyte sensor 174 is a volatile organic compound (VOC) sensor that can be used to detect carbon-based chemicals or compounds, such as carbon dioxide. In some implementations, the analyte sensor 174 can also be used to detect whether the user 210 is breathing through their nose or mouth. For example, if the data output by an analyte sensor 174 positioned near the mouth of the user 210 or within the facial mask (in implementations where the user interface 124 is a facial mask) detects the presence of an analyte, the control system 110 can use this data as an indication that the user 210 is breathing through their mouth.

The moisture sensor 176 outputs data that can be stored in the memory device 114 and used by the control system 110. The moisture sensor 176 can be used to detect moisture in various areas surrounding the user (e.g., inside the conduit 126 or the user interface 124, near the user 210's face, near the connection between the conduit 126 and the user interface 124, near the connection between the conduit 126 and the respiratory therapy device 122, etc.). Thus, in some implementations, the moisture sensor 176 can be coupled to or integrated into the user interface 124 or in the conduit 126 to monitor the humidity of the pressurized air from the respiratory therapy device 122. In other implementations, the moisture sensor 176 is placed near any area where moisture levels need to be monitored. The moisture sensor 176 can also be used to monitor the humidity of the ambient environment surrounding the user 210, for example, the air inside the bedroom. The moisture sensor 176 can also be used to track the user's biometric response to environmental changes.

The LiDAR sensor 178 can be used for depth and distance sensing, which in turn can be used to generate a structural profile the user 210's head, mouth, and/or neck. This type of optical sensor (e.g., laser sensor) can be used to detect objects and build three dimensional (3D) maps of the surroundings, such as of a living space. LiDAR can generally utilize a pulsed laser to make time of flight measurements. LiDAR is also referred to as 3D laser scanning. In an example of use of such a sensor, a fixed or mobile device (such as a smartphone) having a LiDAR sensor 178 can measure and map an area extending 5 meters or more away from the sensor. The LiDAR data can be fused with point cloud data estimated by an electromagnetic RADAR sensor, for example. The LiDAR sensor(s) 178 can also use artificial intelligence (AI) to automatically geofence RADAR systems by detecting and classifying features in a space that might cause issues for RADAR systems, such a glass windows (which can be highly reflective to RADAR). LiDAR can also be used to provide an estimate of the height of a person, as well as changes in height when the person sits down, or falls down, for example. LiDAR may be used to form a 3D mesh representation of an environment. In a further use, for solid surfaces through which radio waves pass (e.g., radio-translucent materials), the LiDAR may reflect off such surfaces, thus allowing a classification of different type of obstacles. Further, while a LiDAR sensor 178 is described herein, in some cases one or more other ranging sensors can be used instead of or in addition to the LiDAR sensor 178, such as an ultrasonic ranging sensor, an electromagnetic RADAR sensor, the IR sensor 152, and the like.

In some implementations, the one or more sensors 130 also include a galvanic skin response (GSR) sensor, a blood flow sensor, a respiration sensor, a pulse sensor, a sphygmomanometer sensor, an oximetry sensor, a sonar sensor, a RADAR sensor, a blood glucose sensor, a color sensor, a pH sensor, an air quality sensor, a tilt sensor, a rain sensor, a soil moisture sensor, a water flow sensor, an alcohol sensor, or any combination thereof.

While shown separately in FIG. 1, any combination of the one or more sensors 130 can be integrated into and/or coupled to any one or more of the components of the system 100, including the respiratory therapy device 122, the user interface 124, the conduit 126, the humidification tank 129, the control system 110, the user device 170, the activity tracker 182, or any combination thereof. For example, the microphone 140 and the speaker 142 can be integrated into and/or coupled to the user device 170 and the pressure sensor and/or flow rate sensor 134 are integrated into and/or coupled to the respiratory therapy device 122. In another example, the acoustic sensor 141 and/or the RF sensor 147 can be integrated in and/or coupled to the user device 170. In such implementations, the user device 170 can be considered a secondary device that generates additional or secondary data for use by the system 100 (e.g., the control system 110) according to some aspects of the present disclosure.

In some implementations, at least one of the one or more sensors 130 is not coupled to the respiratory therapy device 122, the control system 110, or the user device 170, and is positioned generally adjacent to the user 210 during the sleep session (e.g., positioned on or in contact with a portion of the user 210, worn by the user 210, coupled to or positioned on the nightstand, coupled to the mattress, coupled to the ceiling, etc.). More generally, the one or more sensors 130 can be positioned at any suitable location relative to the user such that the one or more sensors 130 can generate physiological data associated with the user and/or the bed partner 212 during one or more sleep session.

The user device 170 (FIG. 1) can include a display device 172. The user device 170 can be, for example, a mobile device such as a smart phone, a tablet, a gaming console, a smart watch, a laptop, or the like. Alternatively, the user device 170 can be an external sensing system, a television (e.g., a smart television) or another smart home device (e.g., a smart speaker(s) such as Google Home, Amazon Echo, Alexa etc.). In some implementations, the user device 170 is a wearable device (e.g., a smart watch). The display device 172 is generally used to display image(s) including still images, video images, or both. In some implementations, the display device 172 acts as a human-machine interface (HMI) that includes a graphic user interface (GUI) configured to display the image(s) and an input interface. The display device 172 can be an LED display, an OLED display, an LCD display, or the like. The input interface can be, for example, a touchscreen or touch-sensitive substrate, a mouse, a keyboard, or any sensor system configured to sense inputs made by a human user interacting with the user device 170. In some implementations, one or more user devices 170 can be used by and/or included in the system 100.

The blood pressure device 180 is generally used to aid in generating physiological data (such as cardiovascular data) for determining one or more blood pressure measurements associated with the user 210. The blood pressure device 180 can include at least one of the one or more sensors 130 to measure, for example, a systolic blood pressure component and/or a diastolic blood pressure component.

In some implementations, the blood pressure device 180 is a sphygmomanometer including an inflatable cuff that can be worn by the user 210 and a pressure sensor (e.g., the pressure sensor 132 described herein). For example, as shown in the example of FIG. 2, the blood pressure device 180 can be worn on an upper arm of the user 210. In such implementations where the blood pressure device 180 is a sphygmomanometer, the blood pressure device 180 also includes a pump (e.g., a manually operated bulb) for inflating the cuff. In some implementations, the blood pressure device 180 is coupled to the respiratory therapy device 122 of the respiratory therapy system 120, which in turn delivers pressurized air to inflate the cuff. More generally, the blood pressure device 180 can be communicatively coupled to, and/or optionally physically integrated with (e.g., within a housing) the respiratory therapy system 120. Additionally, or alternatively, the blood pressure device 180 can be communicatively coupled to the control system 110, the memory device 114, the user device 170, and/or the activity tracker 182, which are in turn communicatively coupled to the respiratory therapy system 120.

In some implementations, the blood pressure device 180 is an invasive device which can continuously monitor arterial blood pressure of the user 210 and take an arterial blood sample on demand for analyzing a gas content of the arterial blood. In other implementations, the blood pressure device 180 is a non-invasive continuous blood pressure monitor that uses a radio frequency (RF) sensor, a Radio Detection and Ranging (RADAR) sensor, a Sound Navigation and Ranging (SONAR) sensor, an infrared (TR) sensor, a pressure sensor, a displacement sensor, or a combination thereof. The RF sensor is capable of measuring blood pressure of the user 210 once very few seconds (e.g. 3 seconds, 5 seconds, 7 seconds, etc.) The RF sensor may use a continuous wave; a frequency-modulated continuous wave (FMCW) with ramp chirp, triangle, sinewave, and other modulation schemes such as phase-shift keying (PSK), frequency shift keying (FSK) etc.; a pulsed continuous wave; and/or a wave spread in ultra wideband (UWB) ranges (which may include spreading, Pseudo Random Noise (PRN) codes or impulse systems).

When using the RADAR sensor or the SONAR sensor, a mattress on the bed 230 can calculate Ballistocardiography (BCG), and an optical sensor located on the body of the user 210 (e.g., smartwatch, smartpatch, etc.) or remotely (e.g. video camera) can calculate Photoplethysmography (PPG), in some implementations. The BCG and PPG values can then be used to measure a time delay between these two signals in order to calculate both systolic blood pressure and diastolic blood pressure.

In some implementations, the PPG with auto gain and signal to noise ratio (SNR) management can be used to calculate pulse transit time (PTT), pulse wave analysis, and with appropriate calibration parameters (either demographic or personalized) can be used to estimate the blood pressure of the user 210. For example, an optical sensor can emit coherent light into the skin of the user 210, and then collect and capture the reflected light from the red blood cells in the blood vessels in the skin under the optical sensor. Thus, the optical sensor and associated software is capable of detecting the pulse wave to determine a measurement of the blood pressure of the user 210. Other techniques can use video directly, such as using transdermal optical imaging (e.g., via a customized camera system or via a smartphone) to measure blood pressure from a video of the user's face (such as with ambient light, or a light such as a LED or infrared source). Yet other sensors can include ultrasonic sensors, whereby pulses and return echoes are used to map the anterior and posterior walls of the artery.

In still other implementations, the blood pressure device 180 is an ambulatory blood pressure monitor communicatively coupled to the respiratory therapy system 120. An ambulatory blood pressure monitor includes a portable recording device attached to a belt or strap worn by the user 210 and an inflatable cuff attached to the portable recording device and worn around an arm of the user 210. The ambulatory blood pressure monitor is configured to measure blood pressure between about every fifteen minutes to about thirty minutes over a 24-hour or a 48-hour period. The ambulatory blood pressure monitor may measure heart rate of the user 210 at the same time. These multiple readings are averaged over the 24-hour period. The ambulatory blood pressure monitor determines any changes in the measured blood pressure and heart rate of the user 210, as well as any distribution and/or trending patterns of the blood pressure and heart rate data during a sleeping period and an awakened period of the user 210. The measured data and statistics may then be communicated to the respiratory therapy system 120.

The activity tracker 182 is generally used to aid in generating physiological data for determining an activity measurement associated with the user 210. The activity tracker 182 can include one or more of the sensors 130 described herein, such as, for example, the motion sensor 138 (e.g., one or more accelerometers and/or gyroscopes), the PPG sensor 154, and/or the ECG sensor 156. The physiological data from the activity tracker 182 can be used to determine, for example, a number of steps, a distance traveled, a number of steps climbed, a duration of physical activity, a type of physical activity, an intensity of physical activity, time spent standing, a respiration rate, an average respiration rate, a resting respiration rate, a maximum respiration rate, a respiration rate variability, a heart rate, an average heart rate, a resting heart rate, a maximum heart rate, a heart rate variability, a number of calories burned, blood oxygen saturation, electrodermal activity (also known as skin conductance or galvanic skin response), or any combination thereof. In some implementations, the activity tracker 182 is coupled (e.g., electronically or physically) to the user device 170.

In some implementations, the activity tracker 182 is a wearable device that can be worn by the user 210, such as a smartwatch, a wristband, a ring, or a patch. For example, referring to FIG. 2, the activity tracker 182 is worn on a wrist of the user 210. The activity tracker 182 can also be coupled to or integrated a garment or clothing that is worn by the user 210. Alternatively, still, the activity tracker 182 can also be coupled to or integrated into (e.g., within the same housing) the user device 170. More generally, the activity tracker 182 can be communicatively coupled with, or physically integrated into (e.g., within a housing), the control system 110, the memory device 114, the respiratory therapy system 120, the user device 170, and/or the blood pressure device 180.

While the control system 110 and the memory device 114 are described and shown in FIG. 1 as being a separate and distinct component of the system 100, in some implementations, the control system 110 and/or the memory device 114 are integrated into the user device 170 and/or the respiratory therapy device 122. Alternatively, in some implementations, the control system 110 or a portion thereof (e.g., the processor 112) can be located in a cloud (e.g., integrated into a server, integrated into an Internet of Things (IoT) device, connected to the cloud, be subject to edge cloud processing, etc.), located in one or more servers (e.g., remote servers, local servers, etc., or any combination thereof.

While system 100 is shown as including all of the components described above, more or fewer components can be included in a system according to implementations of the present disclosure. For example, a first alternative system includes the control system 110, the memory device 114, and at least one of the one or more sensors 130 and does not include the respiratory therapy system 120. As another example, a second alternative system includes the control system 110, the memory device 114, at least one of the one or more sensors 130, and the user device 170. As yet another example, a third alternative system includes the control system 110, the memory device 114, the respiratory therapy system 120, at least one of the one or more sensors 130, and the user device 170. As a further example, a fourth alternative system includes the control system 110, the memory device 114, the respiratory therapy system 120, at least one of the one or more sensors 130, the user device 170, and the blood pressure device 180 and/or activity tracker 182. Thus, various systems can be formed using any portion or portions of the components shown and described herein and/or in combination with one or more other components.

Figure 3:
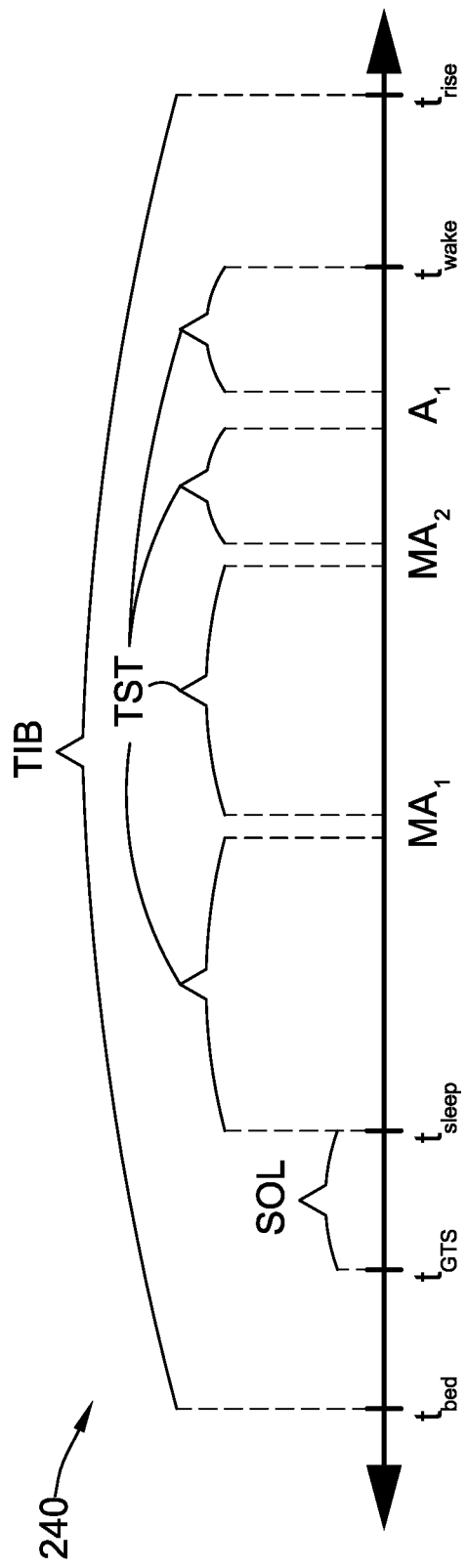
FIG. 3 illustrates an exemplary timeline for a sleep session, according to some implementations of the present disclosure.

As used herein, a sleep session can be defined in a number of ways based on, for example, an initial start time and an end time. Referring to FIG. 3, an exemplary timeline 240 for a sleep session is illustrated. The timeline 240 includes an enter bed time ($t_{bed}$), a go-to-sleep time ($t_{GTS}$), an initial sleep time ($t_{sleep}$), a first micro-awakening $MA_1$ and a second micro-awakening $MA_2$, a wake-up time ($t_{wake}$), and a rising time ($t_{rise}$).

As used herein, a sleep session can be defined in multiple ways. For example, a sleep session can be defined by an initial start time and an end time. In some implementations, a sleep session is a duration where the user is asleep, that is, the sleep session has a start time and an end time, and during the sleep session, the user does not wake until the end time. That is, any period of the user being awake is not included in a sleep session. From this first definition of sleep session, if the user wakes ups and falls asleep multiple times in the same night, each of the sleep intervals separated by an awake interval is a sleep session.

Alternatively, in some implementations, a sleep session has a start time and an end time, and during the sleep session, the user can wake up, without the sleep session ending, so long as a continuous duration that the user is awake is below an awake duration threshold. The awake duration threshold can be defined as a percentage of a sleep session. The awake duration threshold can be, for example, about twenty percent of the sleep session, about fifteen percent of the sleep session duration, about ten percent of the sleep session duration, about five percent of the sleep session duration, about two percent of the sleep session duration, etc., or any other threshold percentage. In some implementations, the awake duration threshold is defined as a fixed amount of time, such as, for example, about one hour, about thirty minutes, about fifteen minutes, about ten minutes, about five minutes, about two minutes, etc., or any other amount of time.

In some implementations, a sleep session is defined as the entire time between the time in the evening at which the user first entered the bed, and the time the next morning when user last left the bed. Put another way, a sleep session can be defined as a period of time that begins on a first date (e.g., Monday, Jan. 6, 2020) at a first time (e.g., 10:00 PM), that can be referred to as the current evening, when the user first enters a bed with the intention of going to sleep (e.g., not if the user intends to first watch television or play with a smart phone before going to sleep, etc.), and ends on a second date (e.g., Tuesday, Jan. 7, 2020) at a second time (e.g., 7:00 AM), that can be referred to as the next morning, when the user first exits the bed with the intention of not going back to sleep that next morning.

In some implementations, the user can manually define the beginning of a sleep session and/or manually terminate a sleep session. For example, the user can select (e.g., by clicking or tapping) one or more user-selectable element that is displayed on the display device 172 of the user device 170 (FIG. 1) to manually initiate or terminate the sleep session.

Generally, the sleep session includes any point in time after the user 210 has laid or sat down in the bed 230 (or another area or object on which they intend to sleep), and has turned on the respiratory therapy device 122 and donned the user interface 124. The sleep session can thus include time periods (i) when the user 210 is using the CPAP system but before the user 210 attempts to fall asleep (for example when the user 210 lays in the bed 230 reading a book); (ii) when the user 210 begins trying to fall asleep but is still awake; (iii) when the user 210 is in a light sleep (also referred to as stage 1 and stage 2 of non-rapid eye movement (NREM) sleep); (iv) when the user 210 is in a deep sleep (also referred to as slow-wave sleep, SWS, or stage 3 of NREM sleep); (v) when the user 210 is in rapid eye movement (REM) sleep; (vi) when the user 210 is periodically awake between light sleep, deep sleep, or REM sleep; or (vii) when the user 210 wakes up and does not fall back asleep.

The sleep session is generally defined as ending once the user 210 removes the user interface 124, turns off the respiratory therapy device 122, and gets out of bed 230. In some implementations, the sleep session can include additional periods of time, or can be limited to only some of the above-disclosed time periods. For example, the sleep session can be defined to encompass a period of time beginning when the respiratory therapy device 122 begins supplying the pressurized air to the airway or the user 210, ending when the respiratory therapy device 122 stops supplying the pressurized air to the airway of the user 210, and including some or all of the time points in between, when the user 210 is asleep or awake.

Referring to the timeline 240 in FIG. 3, the enter bed time $t_{bed}$ is associated with the time that the user initially enters the bed (e.g., bed 230 in FIG. 2) prior to falling asleep (e.g., when the user lies down or sits in the bed). The enter bed time $t_{bed}$ can be identified based on a bed threshold duration to distinguish between times when the user enters the bed for sleep and when the user enters the bed for other reasons (e.g., to watch TV). For example, the bed threshold duration can be at least about 10 minutes, at least about 20 minutes, at least about 30 minutes, at least about 45 minutes, at least about 1 hour, at least about 2 hours, etc. While the enter bed time $t_{bed}$ is described herein in reference to a bed, more generally, the enter time $t_{bed}$ can refer to the time the user initially enters any location for sleeping (e.g., a couch, a chair, a sleeping bag, etc.).

The go-to-sleep time (GTS) is associated with the time that the user initially attempts to fall asleep after entering the bed ($t_{bed}$). For example, after entering the bed, the user may engage in one or more activities to wind down prior to trying to sleep (e.g., reading, watching TV, listening to music, using the user device 170, etc.). The initial sleep time ($t_{sleep}$) is the time that the user initially falls asleep. For example, the initial sleep time ($t_{sleep}$) can be the time that the user initially enters the first non-REM sleep stage.

The wake-up time $t_{wake}$ is the time associated with the time when the user wakes up without going back to sleep (e.g., as opposed to the user waking up in the middle of the night and going back to sleep). The user may experience one of more unconscious microawakenings (e.g., microawakenings $MA_1$ and $MA_2$) having a short duration (e.g., 5 seconds, 10 seconds, 30 seconds, 1 minute, etc.) after initially falling asleep. In contrast to the wake-up time $t_{wake}$, the user goes back to sleep after each of the microawakenings $MA_1$ and $MA_2$. Similarly, the user may have one or more conscious awakenings (e.g., awakening A) after initially falling asleep (e.g., getting up to go to the bathroom, attending to children or pets, sleep walking, etc.). However, the user goes back to sleep after the awakening A. Thus, the wake-up time $t_{wake}$ can be defined, for example, based on a wake threshold duration (e.g., the user is awake for at least 15 minutes, at least 20 minutes, at least 30 minutes, at least 1 hour, etc.).

Similarly, the rising time $t_{rise}$ is associated with the time when the user exits the bed and stays out of the bed with the intent to end the sleep session (e.g., as opposed to the user getting up during the night to go to the bathroom, to attend to children or pets, sleep walking, etc.). In other words, the rising time $t_{rise}$ is the time when the user last leaves the bed without returning to the bed until a next sleep session (e.g., the following evening). Thus, the rising time $t_{rise}$ can be defined, for example, based on a rise threshold duration (e.g., the user has left the bed for at least 15 minutes, at least 20 minutes, at least 30 minutes, at least 1 hour, etc.). The enter bed time $t_{bed}$ time for a second, subsequent sleep session can also be defined based on a rise threshold duration (e.g., the user has left the bed for at least 4 hours, at least 6 hours, at least 8 hours, at least 12 hours, etc.).

As described above, the user may wake up and get out of bed one more times during the night between the initial $t_{bed}$ and the final $t_{rise}$. In some implementations, the final wake-up time $t_{wake}$ and/or the final rising time $t_{rise}$ that are identified or determined based on a predetermined threshold duration of time subsequent to an event (e.g., falling asleep or leaving the bed). Such a threshold duration can be customized for the user. For a standard user which goes to bed in the evening, then wakes up and goes out of bed in the morning any period (between the user waking up ($t_{wake}$) or raising up ($t_{rise}$), and the user either going to bed ($t_{bed}$), going to sleep ($t_{GTS}$) or falling asleep ($t_{sleep}$) of between about 12 and about 18 hours can be used. For users that spend longer periods of time in bed, shorter threshold periods may be used (e.g., between about 8 hours and about 14 hours). The threshold period may be initially selected and/or later adjusted based on the system monitoring the user's sleep behavior.

The total time in bed (TIB) is the duration of time between the time enter bed time $t_{bed}$ and the rising time $t_{rise}$. The total sleep time (TST) is associated with the duration between the initial sleep time and the wake-up time, excluding any conscious or unconscious awakenings and/or micro-awakenings therebetween. Generally, the total sleep time (TST) will be shorter than the total time in bed (TIB) (e.g., one minute short, ten minutes shorter, one hour shorter, etc.). For example, referring to the timeline 240 of FIG. 3, the total sleep time (TST) spans between the initial sleep time $t_{sleep}$ and the wake-up time $t_{wake}$, but excludes the duration of the first micro-awakening $MA_1$, the second micro-awakening $MA_2$, and the awakening A. As shown, in this example, the total sleep time (TST) is shorter than the total time in bed (TIB).

In some implementations, the total sleep time (TST) can be defined as a persistent total sleep time (PTST). In such implementations, the persistent total sleep time excludes a predetermined initial portion or period of the first non-REM stage (e.g., light sleep stage). For example, the predetermined initial portion can be between about 30 seconds and about 20 minutes, between about 1 minute and about 10 minutes, between about 3 minutes and about 5 minutes, etc. The persistent total sleep time is a measure of sustained sleep, and smooths the sleep-wake hypnogram. For example, when the user is initially falling asleep, the user may be in the first non-REM stage for a very short time (e.g., about 30 seconds), then back into the wakefulness stage for a short period (e.g., one minute), and then goes back to the first non-REM stage. In this example, the persistent total sleep time excludes the first instance (e.g., about 30 seconds) of the first non-REM stage.

In some implementations, the sleep session is defined as starting at the enter bed time ($t_{bed}$) and ending at the rising time ($t_{rise}$), i.e., the sleep session is defined as the total time in bed (TIB). In some implementations, a sleep session is defined as starting at the initial sleep time ($t_{sleep}$) and ending at the wake-up time ($t_{wake}$). In some implementations, the sleep session is defined as the total sleep time (TST). In some implementations, a sleep session is defined as starting at the go-to-sleep time ($t_{GTS}$) and ending at the wake-up time ($t_{wake}$). In some implementations, a sleep session is defined as starting at the go-to-sleep time ($t_{GTS}$) and ending at the rising time ($t_{rise}$). In some implementations, a sleep session is defined as starting at the enter bed time ($t_{bed}$) and ending at the wake-up time ($t_{wake}$). In some implementations, a sleep session is defined as starting at the initial sleep time ($t_{sleep}$) and ending at the rising time ($t_{rise}$).

Figure 4:
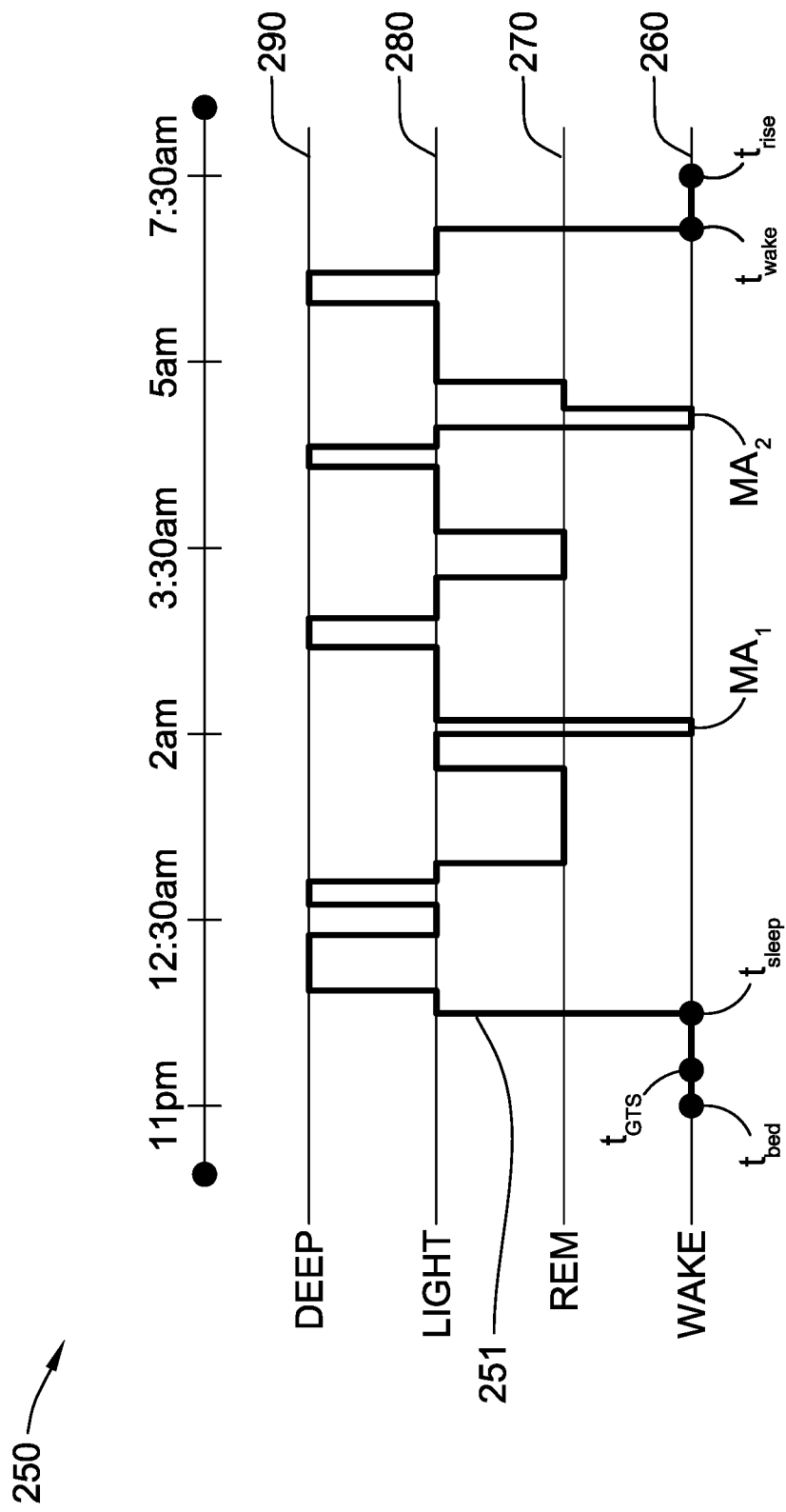
FIG. 4 illustrates an exemplary hypnogram associated with the sleep session of FIG. 3, according to some implementations of the present disclosure.

Referring to FIG. 4, an exemplary hypnogram 250 corresponding to the timeline 240 (FIG. 3), according to some implementations, is illustrated. As shown, the hypnogram 250 includes a sleep-wake signal 251, a wakefulness stage axis 260, a REM stage axis 270, a light sleep stage axis 280, and a deep sleep stage axis 290. The intersection between the sleep-wake signal 251 and one of the axes 260-290 is indicative of the sleep stage at any given time during the sleep session.

The sleep-wake signal 251 can be generated based on physiological data associated with the user (e.g., generated by one or more of the sensors 130 described herein). The sleep-wake signal can be indicative of one or more sleep states, including wakefulness, relaxed wakefulness, micro-awakenings, a REM stage, a first non-REM stage, a second non-REM stage, a third non-REM stage, or any combination thereof. In some implementations, one or more of the first non-REM stage, the second non-REM stage, and the third non-REM stage can be grouped together and categorized as a light sleep stage or a deep sleep stage. For example, the light sleep stage can include the first non-REM stage and the deep sleep stage can include the second non-REM stage and the third non-REM stage. While the hypnogram 250 is shown in FIG. 4 as including the light sleep stage axis 280 and the deep sleep stage axis 290, in some implementations, the hypnogram 250 can include an axis for each of the first non-REM stage, the second non-REM stage, and the third non-REM stage. In other implementations, the sleep-wake signal can also be indicative of a respiration signal, a respiration rate, an inspiration amplitude, an expiration amplitude, an inspiration-expiration amplitude ratio, an inspiration-expiration duration ratio, a number of events per hour, a pattern of events, or any combination thereof. Information describing the sleep-wake signal can be stored in the memory device 114.

The hypnogram 250 can be used to determine one or more sleep-related parameters, such as, for example, a sleep onset latency (SOL), wake-after-sleep onset (WASO), a sleep efficiency (SE), a sleep fragmentation index, sleep blocks, or any combination thereof.

The sleep onset latency (SOL) is defined as the time between the go-to-sleep time ($t_{GTS}$) and the initial sleep time ($t_{sleep}$). In other words, the sleep onset latency is indicative of the time that it took the user to actually fall asleep after initially attempting to fall asleep. In some implementations, the sleep onset latency is defined as a persistent sleep onset latency (PSOL). The persistent sleep onset latency differs from the sleep onset latency in that the persistent sleep onset latency is defined as the duration time between the go-to-sleep time and a predetermined amount of sustained sleep. In some implementations, the predetermined amount of sustained sleep can include, for example, at least 10 minutes of sleep within the second non-REM stage, the third non- REM stage, and/or the REM stage with no more than 2 minutes of wakefulness, the first non-REM stage, and/or movement therebetween. In other words, the persistent sleep onset latency requires up to, for example, 8 minutes of sustained sleep within the second non-REM stage, the third non-REM stage, and/or the REM stage. In other implementations, the predetermined amount of sustained sleep can include at least 10 minutes of sleep within the first non-REM stage, the second non-REM stage, the third non-REM stage, and/or the REM stage subsequent to the initial sleep time. In such implementations, the predetermined amount of sustained sleep can exclude any micro-awakenings (e.g., a ten second micro-awakening does not restart the 10-minute period).

The wake-after-sleep onset (WASO) is associated with the total duration of time that the user is awake between the initial sleep time and the wake-up time. Thus, the wake-after-sleep onset includes short and micro-awakenings during the sleep session (e.g., the micro-awakenings $MA_1$ and $MA_2$ shown in FIG. 4), whether conscious or unconscious. In some implementations, the wake-after-sleep onset (WASO) is defined as a persistent wake-after-sleep onset (PWASO) that only includes the total durations of awakenings having a predetermined length (e.g., greater than 10 seconds, greater than 30 seconds, greater than 60 seconds, greater than about 5 minutes, greater than about 10 minutes, etc.)

The sleep efficiency (SE) is determined as a ratio of the total time in bed (TIB) and the total sleep time (TST). For example, if the total time in bed is 8 hours and the total sleep time is 7.5 hours, the sleep efficiency for that sleep session is 93.75%. The sleep efficiency is indicative of the sleep hygiene of the user. For example, if the user enters the bed and spends time engaged in other activities (e.g., watching TV) before sleep, the sleep efficiency will be reduced (e.g., the user is penalized). In some implementations, the sleep efficiency (SE) can be calculated based on the total time in bed (TIB) and the total time that the user is attempting to sleep. In such implementations, the total time that the user is attempting to sleep is defined as the duration between the go-to-sleep (GTS) time and the rising time described herein. For example, if the total sleep time is 8 hours (e.g., between 11 PM and 7 AM), the go-to-sleep time is 10:45 PM, and the rising time is 7:15 AM, in such implementations, the sleep efficiency parameter is calculated as about 94%.

The fragmentation index is determined based at least in part on the number of awakenings during the sleep session. For example, if the user had two micro-awakenings (e.g., micro-awakening $MA_1$ and micro-awakening $MA_2$ shown in FIG. 4), the fragmentation index can be expressed as 2. In some implementations, the fragmentation index is scaled between a predetermined range of integers (e.g., between 0 and 10).

The sleep blocks are associated with a transition between any stage of sleep (e.g., the first non-REM stage, the second non-REM stage, the third non-REM stage, and/or the REM) and the wakefulness stage. The sleep blocks can be calculated at a resolution of, for example, 30 seconds.

In some implementations, the systems and methods described herein can include generating or analyzing a hypnogram including a sleep-wake signal to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof based at least in part on the sleep-wake signal of a hypnogram. The hypnogram can be generated in real-time during the sleep session, or can be generated after the sleep session is completed.

In other implementations, one or more of the sensors 130 can be used to determine or identify the enter bed time ($t_{bed}$), the go-to-sleep time ($t_{GTS}$), the initial sleep time ($t_{sleep}$), one or more first micro-awakenings (e.g., $MA_1$ and $MA_2$), the wake-up time ($t_{wake}$), the rising time ($t_{rise}$), or any combination thereof, which in turn define the sleep session. For example, the enter bed time $t_{bed}$ can be determined based on, for example, data generated by the motion sensor 138, the microphone 140, the camera 150, or any combination thereof. The go-to-sleep time can be determined based on, for example, data from the motion sensor 138 (e.g., data indicative of no movement by the user), data from the camera 150 (e.g., data indicative of no movement by the user and/or that the user has turned off the lights) data from the microphone 140 (e.g., data indicative of the using turning off a TV), data from the user device 170 (e.g., data indicative of the user no longer using the user device 170), data from the pressure sensor 132 and/or the flow rate sensor 134 (e.g., data indicative of the user turning on the respiratory therapy device 122, data indicative of the user donning the user interface 124, etc.), or any combination thereof.

Figure 5:
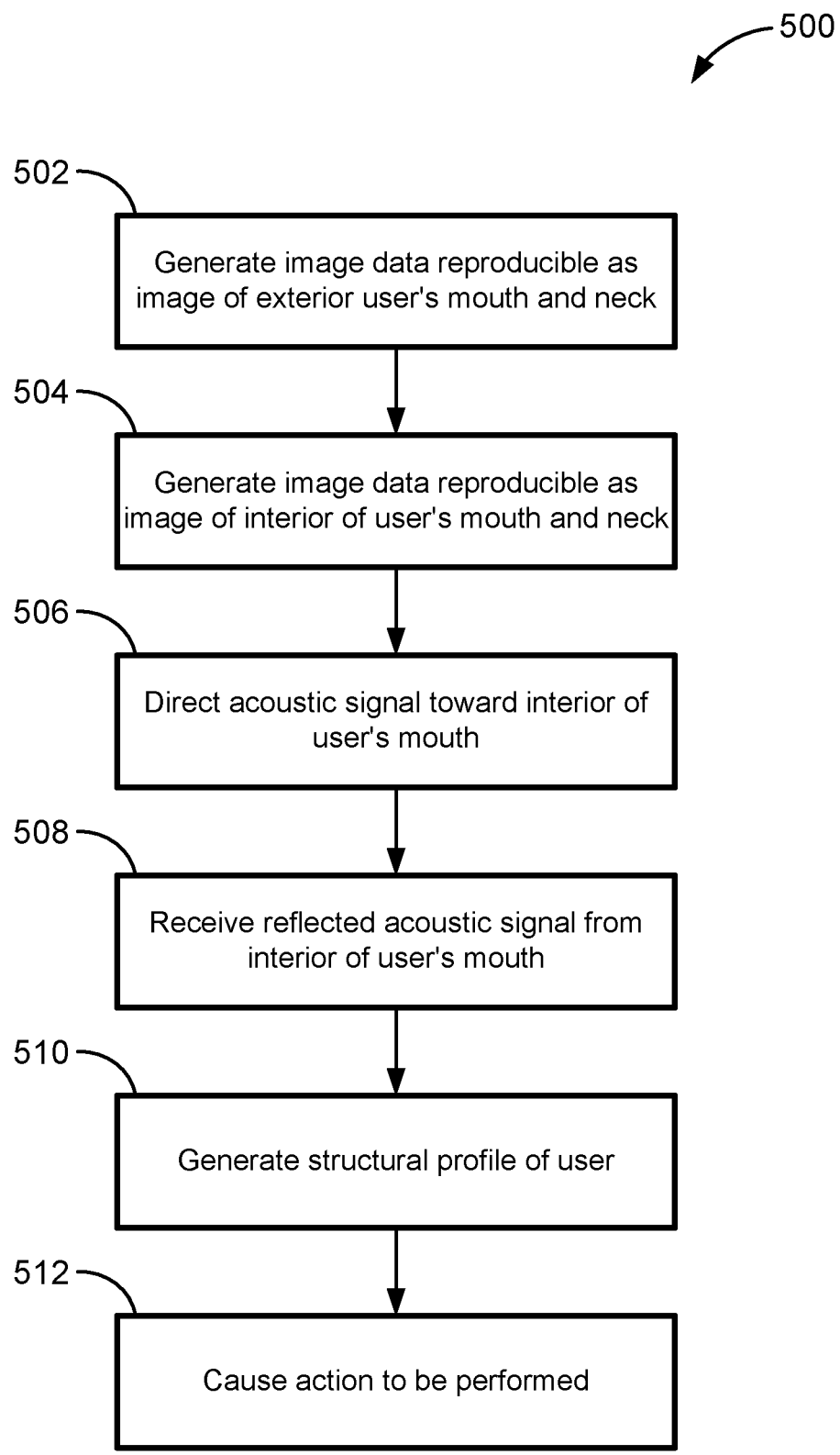
FIG. 5 is a process flow diagram for a method of analyzing physical features of an individual, according to some implementations of the present disclosure.

Referring now to FIG. 5, a method 500 for analyzing physical features of a user (such as user 210) is illustrated. Generally, there are certain physical features, properties or characteristics of the user that are correlated with the user developing sleep-disordered breathing and/or obstructive sleep apnea. These physical features can include the size of the user's neck and/or collar; the structure of the user's jaw; the shape and size of various internal structures, including the roof of the user's mouth, the user's tongue, the user's tonsils, the user's teeth, and the user's uvula; the overall shape of the user's mouth; and other characteristics.

Certain values for these features, such as certain sizes, shapes, etc., can be correlated with an increased risk of developing sleep-disordered breathing and/or obstructive sleep apnea, including: neck/collar sizes above a threshold size (which can be an indicator of excess body fat); the user's lower jaw receding relative to the user's upper jaw; the shape of the user's mouth potentially causing airway collapse; the size of the user's tongue being above a baseline size for the user's age and gender; the shape of the user's mouth generally changing over time; deviations in the shape of the user's skull from an expected shape (for example, reduced front and/or rear skull measurements can indicate the presence of brachycephaly); and others. With respect to the shape of the user's mouth, upper airway restriction or collapse is often seen at the soft palate, the larynx, the lateral pharyngeal wall, and the tongue. If the user has a narrow throat, they are at an increased risk of these tissues "closing in" on each other and blocking the airway, when the muscles in the upper throat relax during sleep. Additionally, large tonsils can lead to airway collapse, as can a large tongue that relaxes and rolls back during sleep.

Both external and internal features of the user's head, neck, and mouth can thus be analyzed to track these physical characteristics of time, in order to determine and update one or more risk factors for developing sleep-disordered breathing and/or obstructive sleep apnea.

Method 500 can be implemented using a control system (such as control system 110 of system 100) and any number of sensors (such as any of sensors 130). A memory device (such as memory device 114 of system 100) can be used to store any type of data utilized in the steps of method 500. In some implementations, method 500 can be implemented using at least a handheld device (such as the user's smart phone, which could be the user device 170).

Step 502 of method 500 includes generating, via one or more image sensors, first image data that is reproducible as an image of the exterior of the head of the user. The first image data can be associated with the various aspects of the exterior of the user's head, including the mouth, jawline, skull, eyes, nose, etc. Step 502 thus includes generating data that can be used at least to identify various physical features of the exterior of the user 210's head 214, such as the user's collar size, the size and shape of the user 210's jaw, the size and shape of the user 210's skull, and others. As used herein, the user's head can include the user's mouth, eyes, nose, skull, face, etc.

The image sensor could be any suitable image sensor, such as camera 150 of system 100. In some implementations, camera 150 is integrated into a handheld device, the user's mobile device, e.g., the image sensor is the camera of the user's smart phone. The image sensor could be a front-facing camera of the user's smart phone, such that the display of the smart phone (which can be the display device 172 of the user device 170) shows a real-time view of the user. The user can utilize the real-time view to properly position the image sensor for generating the first image data. In other implementations, the image sensor is the back-facing camera of the user's smart phone, and the display of the smart phone can be viewed by the user with, for example, the aid of a mirror.

FIGS. 6A and 6B illustrate a user 210 using a smart phone 402 with a camera 404 to generate the first image data of the exterior of the user 210's head 214 and/or neck 216. In the illustrated implementation, the image sensor is the camera 404 of the user 210's smart phone 402. In other implementations, the image sensor can be a camera of a different handheld device (such as a tablet computer). In still other implementations, the image sensor may not be a component of the handheld device. Thus, the image sensors can be integrated into the handheld device, or can be part of other devices.

The display of the smart phone 402 can be used to display a real-time video image 211 of at least a portion of the user 210, and to illuminate at least a portion of the user 210. For example, in FIGS. 6A and 6B, a first portion 406A of the display of the smart phone 402 displays the real-time video image 211 of the user 210. Various features of the head 214 of the user 210 are visible in the real-time video image 211, including the user's neck 216, eyes 218, mouth 220, and nose 222. The first portion 406A is the portion of the display nearest the camera 404 and the user 210's eyes 218. The user 210 can view the real-time video image 211 in order to properly position the smart phone 402 to obtain the first image data of the exterior of their head 214 and/or neck 216. A second portion 406B of the display of the smart phone 402 is used to illuminate a portion of the user 210's head 214 and/or neck 216. The second portion 406B of the display is the portion furthest away from the camera 404 and the user 210's eyes 218, and closer to the user 210's neck 216 and mouth 220. Generally, the second portion 406B can display any suitable screen, image, object, etc. to illuminate the portion of the user 210. In one example the second portion 406B of the displays shows a blank screen that could be white or another color.

Referring back to FIG. 5, step 504 of method 500 includes generating, via the one or more image sensors, second image data that is reproducible as an image of the interior of the mouth 220 of the user 210. Step 502 thus includes generating data that can be used at least to identify various properties or characteristics of the interior of the user 210's mouth 220, such as the size and shape of the user 210's tongue, tonsils, teeth, jaw, uvula, etc.

FIGS. 7A and 7B illustrate the user 210 using the smart phone 402 to generate the second image data of the interior of the user 210's mouth 220. As shown in FIG. 7A, the user 210 holds the smart phone 402 up to their mouth 220 to generate the second image data with the camera 404 of the smart phone 402. A real-time video image 219 of the user 210's mouth 220 can be displayed by the smart phone 402. In the illustrated implementation, the smart phone 402 is flipped upside down, so that the first portion 406A of the display and the second portion 406B of the display are reversed. In this orientation, the first portion 406A is still closer to the camera 404, while the second portion 406B is still further away from the camera 404. However, the first portion 406A and the camera 404 are now positioned beneath the second portion 406B, closer to the user 210's mouth 220 than the user 210's eyes 218. In turn, the second portion 406B is now positioned beneath the first portion 406A and the camera 404, closer to the user 210's eyes 218 than the user 210's mouth 220. The real-time video image 219 of the user 210's mouth 220 is displayed on the second portion 406B of the display, while the first portion 406A of the display is used for illumination.

By flipping the orientation of the smart phone 402, the camera 404 can focus on the user 210's mouth 220 without rotating out of the line of sight of the user 210. If the smart phone 402 was not flipped, as the user 210 moves the smart phone 402 closer to their mouth 220, the smart phone 402 would need to be rotated downward so that the camera 404 remains focused on the user 210's mouth 220. However, this rotation would also cause the first portion 406A of the display and the displayed real-time video image 211 to rotate downward and out of the user 210's line of sight. Thus, the user would not be able to view the real-time video image 211, to properly guide the placement of the smart phone 402. Because the smart phone 402 has been flipped upside down, the camera 404 can be focused on the user 210's mouth 220, without having to rotate the second portion 406B of the display and the displayed real-time video image 211 of the user 210 out of the user 210's line of sight. The smart phone 402 could also be flipped upside to obtain the first image data of the exterior of the user 210's head 214 and/or neck 216, or could remain properly oriented, as illustrated in FIGS. 6A and 6B.

The second portion 406B of the display can display one or more augmented reality indicia to aid the user 210 in moving the smart phone 402 to a desired position. Generally, when the smart phone 402 is in the desired position, the camera 404 is properly focused on the interior of the user 210's mouth 220, in order to generate the second image data of the interior of the user 210's mouth 220. In some implementations, the augmented reality indicia can include markers to indicate a direction in which the smart phone 402 needs to be moved, or in which direction the user 210 needs to move their head 214 and/or mouth 220.

In some implementations, the smart phone 402 may include a rear image sensor (e.g., a rear camera) located on the rear of the smart phone 402 (e.g., on a side of the smart phone 42 opposite of the display portions 406A and 406B). When utilizing the rear image sensor, the user cannot view the augmented reality indicia on the second portion 406B of the display because it is facing away from them, and instead must use other means to look at the second portion 406B. In one example, the user can use the smart phone 402 while facing a mirror, such that the user can see the reflection of the augmented reality indicia in the mirror. The smart phone 402 would reverse the augmented reality indicia on the second portion 406B of the display, so that the augmented reality indicia appear in the correct orientation in the mirror. In a second example, the content of the second portion 406B of the display (such as images, video, the augmented reality indicia, etc.) could be transmitted to an external device (such as user device 170) that the user can easily view, such as a tablet, bedside display, or smart watch.

In the implementation illustrated in FIG. 7B, the real-time video image 219 is positioned in the upper-left quadrant of the second portion 406B of the display. The marker is an arrow 408 pointing to the upper-left quadrant, indicating the user 210 needs to move the smart phone 402 to the upwards and to the left in order to properly position the camera 404 of the smart phone 402. Thus, the arrow 408 points in the direction in which the user 210 needs to move the smart phone 402. In other implementations, the arrow 408 could point down and to the left, indicating that the user 210 needs to move their mouth 220 down and to the left, so that their mouth 220 is positioned properly relative to the camera 404.

The augmented reality indicia can also include one or more outlines of various physical features of the user 210. These outlines generally have a shape that corresponds to the shape of the physical feature, to aid in aligning the smart phone 402 and the camera 404. For example, in FIG. 7B, the second portion 406B of the display displays an outline 410 of the user's lips. Because the second portion 406B of the display also displays the real-time video image 211 of the user 210, including the user 210's lips, the outline 410 provides an alignment guide for the smart phone 402 and the camera 404. By aligning the outline 410 with the corresponding feature in the real-time video image 211, the user 210 ensures that the camera 404 is positioned to focus on the interior of the user 210's mouth 220. While outline 410 is an outline of the user's lips, the outline could be the outline of any feature of the user 210, such as the user 210's eyes 218, tongue, teeth, uvula, tonsils, or any other features, or combinations of features.

In some implementations, the smart phone 402 is configured to indicate to the user 210 when the smart phone 402 and the camera 404 are in the desired position to capture the second image data of the interior of the user 210's mouth 220. In some implementations, the smart phone 402 can display an indicator either the first portion 406A of the display or the second portion 406B of the display. This indicator could include an image, a symbol, text, etc. The indicator could be displayed continually, or could be displayed in a flashing manner. The augmented reality indicia, such as the arrow 408 or the outline 410, could also be modified when the smart phone 402 and the camera 404 are correctly positioned. For example, the smart phone 402 can cause the augmented reality indicia to change color, change shape, change size, or any combination thereof. In still further implementations, an audible sound can be generated (for example via the smart phone 402's speakers) that indicates that the smart phone 402 and the camera 404 are correctly position. Generally, the smart phone 402 can take any suitable action in order to indicate to the user 210 in any suitable fashion that the smart phone 402 and the camera 404 are in the correct position.

The smart phone 402 can also cause audible sounds to be generated to aid the user 210 in correctly positioning the smart phone 402 and the camera 404. For example, the smart phone 402 could initially play a sound when the smart phone 402 is not in position, and then gradually modify some characteristic of the sound as the user moves the smart phone 402 closer to the correct position. For example, the volume or the pitch of the sound can be increased or decreased as the user 210 moves the smart phone 402 and the camera 404. In another example, the audible sound is continually repeated at some repetition rate. The repetition rate of the audible sound can be increased or decreased (e.g., the sound can be played faster or slower) as the user 210 moves the smart phone 402 and the camera 404.

Referring back to FIG. 5, step 506 of method 500 includes directing an acoustic signal toward the interior of the user 210's mouth 220, and step 508 of method 500 includes receiving a reflected acoustic signal from the interior of the user 210's mouth 220. The result of steps 506 and 506 is to obtain acoustic data associated with structural properties or characteristics of the interior of the user 210's mouth 220. Generally, the smart phone 402 includes an acoustic sensor comprised of one or more speakers and one or more microphones. The smart phone 402 is configured to cause the speakers to emit an acoustic signal (e.g., sound waves), which is directed toward the interior of the mouth 220 of the user 210. The acoustic signal reflects off of various structures within the interior of the user 210's mouth 220, and propagate back toward the smart phone 402. The one or more microphones can then detect the reflected acoustic signal, to thereby generate the acoustic data.

The acoustic signal is indicative of structural characteristics of the user 210's mouth 220, and can be analyzed to determine the size and/or position of various structures within the interior of the user's mouth 220, such as the user's tongue, teeth, jaw, tonsils, uvula, the roof of the user's mouth 220, the back of the user's throat, etc. The smart phone 402 is configured to monitor the amount of time that passes between the acoustic signal being emitted by the speakers, and the reflected acoustic signal being detected by the microphones. Based on the elapsed time, the distance between the smart phone 402 and the structure off which acoustic signal reflected can be determined.

A variety of different techniques can be used to analyze the acoustic signal. In a frequency hopping range gated (FHRG) implementation, the frames/tone pair frame modulator are controlled by the processor (with implicit multi frequency operation using frames etc.). In an adaptive implementation such as adaptive FHRG (AFHRG) or adaptive time of flight (AToF), the system further includes modules for fading detection and explicit frequency shift operations not present in an FHRG implementation. The fading detector module provides a feedback mechanism to adjust the parameters of the system (including frequency shift, modulation type, frame parameters such as number of tones, spacing in time and frequency etc.), in order to optimally detect motion and detailed distance information to map the mouth, in varying channel conditions.

Fading can be directly detected from the amplitude modulation (extracted via envelope detection) variation in the reflected acoustic signal, and/or via changes in specific tone pairs. The fading detector may also receive secondary information from subsequent baseband signal processing, although this may add some processing delay; this can be used to relate actual extracted breathing signal quality/morphology to the current channel conditions, to provide better adaption to maximize useful signal. The fading detector may also process I/Q pairs (pre baseband respiration/heart rate analysis). By using a configuration of non-faded Tx (transmit) waveform(s), the finite emitted signal power of the speaker can also be optimized/best utilized to maximize the useful information received by the sound sensor/receiver Rx (receive), and demodulated/further processed to baseband. In some cases, the system may select a slightly suboptimal (in terms of short term SNR) set of frequencies for Tx, if the system is found to be more stable over a longer period of time (e.g., to avoid multipath variation in fading on a timescale similar to a respiration rate, that might cause "noise"/artefact in the desired demodulated respiration rate band).

The transmitted sound pressure signal generated by the smartphone speaker is reflected by a target, and returns to be sensed at the smartphone microphone. For an omnidirectional source the sound pressure (P(x)) level will decrease with distance x as $$P(x) = \frac{P_0}{4\pi x^2}.$$

The speaker of the smart phone 402 can be direction at 18 kHz, and thus:

$$P(x) = \frac{P_0}{4\pi x^\gamma},$$

where γ is the gain of the speaker, and has a value between 0 and 2, and is typically greater than 1.

The target (e.g., the user 210) has a specific cross-section and reflection coefficient. Reflection from the user 210 is also directional:

$$P(xA) = \sigma(1-\alpha)\frac{P_0}{4\pi x^\beta}.$$

α is the reflector attenuation, and has a value between 0 and 1, and is typically greater than 0.1. β is the reflector gain, and has a value between 0 and 2, and is typically greater than 1. σ is the sonar cross-section.

As a result, a transmitted signal of sound pressure $P_0$ will, on reflection at a distance d, return to the smart phone 402 with an attenuated power level of:

$$P_{rxs}(d) = \sigma(1-\alpha)\frac{P_0}{(4\pi)^2 d^{(\beta+\gamma)}}.$$

The microphone of the smart phone 402 will only receive a portion of the reflected sound pressure signal. The percentage will be dependent on the affective area $A_e$ of the microphone:

$$P_{rxm}(d) = A_e\sigma(1-\alpha)\frac{P_0}{(4\pi)^2 d(\beta+\gamma)}.$$

In this manner, a small fraction of the transmitted acoustic signal is reflected by the user 210 and returns to be received by the microphone of the smart phone 402.

A user within range of an FHRG system at a distance d from acoustic sensor will reflect the acoustic signal. The sound generated by the smart phone 402 due to the model signal for any frequency $f_{nm}$ is:

$$P_{rx}(x, t, w_{nm}) = \frac{P_0}{x^\gamma}\sin 2\pi\left(f_{nm}t + \frac{x}{\lambda_{nm}}\right).$$

The acoustic signal arriving at the target, at a distance d, for any individual frequency is given as:

$$P_{rx}(x, t, w_{nm}) = \frac{P_0}{x^\gamma}\sin 2\pi\left(f_{nm}t + \frac{d}{\lambda_{nm}}\right).$$

The reflected acoustic signal arriving back at the microphone of the smart phone 402 is given as:

$$P_{rx}(x, t, w_{nm}) = A_e\sigma(1-\alpha)\frac{P_0}{(4\pi)^2 d^{(\beta+\gamma)}}\sin 2\pi\left(f_{nm}t + \frac{2d}{\lambda_{nm}}\right).$$

However, if the target distance is moving with a sinusoidal variation, distance d is modified such that $d(x, t, w_b, A_b)=d_0+A_b \sin(2\pi f_b t+\theta)$, where $w_b=2\pi f_b$ is the frequency, $A_b$ is the breathing amplitude, θ is the phase, and $d_0$ is the nominal target distance.

In these situation, the maximum breathing displacement $A_b$ is small compared to the target distance d, and its effect on the reflected acoustic signal can be ignored. As a result, the acoustic signal received by the microphone becomes:

$$P_{rx}(x, t, w_{nm}) = \\ Ae\ \sigma(1-\alpha)\frac{P_0}{(4\pi)^2 d^{(\beta+\gamma)}}\sin\ 2\pi\left(f_{nm}t + \frac{2d_0 + 2A_b\sin(2\pi f_b t + \theta)}{\lambda_{nm}}\right).$$

Because an idealized respiratory movement signal, which may be similar to a cardiac movement signal albeit at different frequencies and displacements, could be thought of as a sinusoidal function of a sinusoidal function, it will have areas of maximum and minimum sensitivity for the same displacement peak to peak amplitude. To correctly recover this signal, it is beneficial to utilize a quadrature phase receiver or similar so that sensitivity nulls are mitigated.

The I and Q baseband signals can then be utilized as a phasor I+jQ to: (i) recover the root mean square (RMS) and phase of the breathing signal, (ii) recover the direction (phasor direction) of the movement, and (iii) recover foldover information by detecting when the phasor changes direction. Analysis of reflected acoustic signals, for example sonar technology, is known in the art, and additional details associated with the reflected acoustic signal can be found at least in WO 2018/050913 and WO 2020/104465, each of which is incorporated by reference herein in its entirety.

In other implementations, if one or more individual tones are used in place of tone pairs, a similar architecture can be utilized to realize an adaptive continuous wave (ACW) system.

In some implementations the smart phone 402 uses the acoustic sensor to perform a scan of the user 210's mouth 220. For example, the acoustic sensor can repeatedly emit acoustic signals and measure their reflections in multiple different directions, in order to determine the position of the various structures within the user 210's mouth 220. The acoustic sensor can thus be used to identify various structures within the user 210's mouth 220, and determine distances between each of the structures, determine the distance between each structure and the acoustic sensor. The acoustic sensor is thus generally used to map out the interior of the user 210's mouth 220.

The acoustic signal emitted by the acoustic sensor can have predominantly a single frequency or frequencies within a narrow bandwidth, or could have frequencies spanning a larger bandwidth. In some implementations, the acoustic signal takes the form of "white noise." In these implementations, the acoustic signal is formed from multiple sound waves having frequencies that span a specific frequency band. The spectral power density of the acoustic signal is constant, such that the acoustic signal has generally equal intensities at different frequencies, thus forming white noise.

In still other implementations, the frequency of the acoustic signal can be swept back and forth within a frequency band. For example, as the acoustic sensor is continually directing the acoustic signal into the interior of the user 210's mouth 220, the frequency can be modulated between a first frequency and a second frequency. Thus, at a first time, the frequency of the acoustic signal is equal to the first frequency. At a second time after the first time, the frequency of the acoustic signal has increased or decreased, and is equal to the second frequency. At a third time after the second time, the frequency of the acoustic signal has again decreased or increased, and is again equal to the first frequency.

In some implementations, the acoustic sensor can be calibrated prior to use. For example, the user 210 can place the smart phone 402 in front of a flat surface, such as a wall, table, etc. The smart phone 402 can cause the acoustic sensor to emit an acoustic signal at the flat surface, and then measure the reflected acoustic signal. Generally, the flat surface will have known or estimated reflective properties, such that the reflected acoustic signal actually received can be compared to the expected reflected acoustic signal. This comparison can then be used to determine a calibration factor for adjusting the reflected acoustic signal measured within the user 210's mouth 220.

Step 510 of method 500 includes generating a structural profile of the user, based at least in part on (i) the image data of the exterior of the user 210's head 214 and/or neck 216, (ii) the image data of the interior of the user's mouth 220, (iii) the reflected acoustic signal from the interior of the user 210's mouth 220, or (iv) any combination of (i)-(iii). The image data and the reflected acoustic signal can be analyzed to identify various physical features of the user 210 as explained herein, such as neck size, jaw position, mouth shape, tongue shape, etc. A structural profile containing information about the user 210 can then be generated. The structural profile contains all of the information about the physical features of the user 210, determined from any combination of the first image data, the second image data, and the reflected acoustic signal.

To generate the structural profile, smart phone 402 can locate the head, face, and mouth 220 of the user using the first image data, such as with eye detection, ear detection, nose detection, etc. The dimensions of the head 214 and neck 216 can be estimated as the smart phone 402 moves around the head 214 and neck 216. The smart phone 402 can also detect if the user's mouth 220 is open, such that the image and acoustic sensor have a clear "view" of the mouth 220, and the smart phone 402 can process the available sensor data/signals to obtain information about the interior of the mouth 220. The smart phone 402 can also, for example, map the tongue location, estimate tongue size (based on, for example, the user moving their tongue in response to commands or instructions), and provide a "view" of the back of the mouth 220 using the second image data and the acoustic data.

In some implementations, the structural profile is based only on the reflected acoustic signal from the interior of the user 210's mouth 220. Thus, in these implementations, steps 502 and 504 of method 500 do not need to be performed. In other implementations, the structural profile can be based additionally or alternatively on the first image data and/or the second image data. In these implementations, one or both of steps 502 and 504 can be performed, in addition to the rest of the steps. Thus, while the steps of method 500 illustrated in FIG. 5 include obtaining the first image data, the second image data, and the reflected acoustic signal, various implementations of method 500 can be practiced that only utilize one or two of the first image data, the second image data, and the reflected acoustic signal.

In some implementations, the structural profile can additionally or alternatively be based on thermal data generated by the camera 404 (which can be the camera 150 of the system 100), and/or sensors of the smart phone 402, such as an IR sensor (which can be the IR sensor 152 of the system 100). For example, inflammation in the user's mouth can be detected using thermal sensors (active or passive). This inflammation can be the result of an infection, irritation from the user of the respiratory therapy device 122 and/or the user interface 124), etc. The inflammation could be located in the user's tonsils and/or gums (e.g., swelling or redness of the tonsils and/or gums), and/or other locations. Heat generated by the inflammation can manifest in the emission of some amount of electromagnetic radiation in the infrared and/or visible ranges. The camera 404 and/or the IR sensor can be used as thermal sensor to detect this emitted electromagnetic radiation, and to determine the local temperature in the user's mouth and/or any temperature differences. The data generated by the camera 404 and/or the IR sensor can then be used to form the structural profile of the user. These techniques can also be used to monitor inflammation in the user's mouth over time.

In still other implementations, the structural profile can additionally or alternatively be based on ranging data generated by one or more ranging sensors, such as a LiDAR sensor (e.g., LiDAR sensor 178), a RADAR sensor (which can be implemented using the RF receiver 146 and the RF transmitter 148 to form an RF sensor 147), an ultrasonic ranging sensor, and others. The ranging data from the ranging sensor can be used to generate structural data about the user's head, mouth, and/or and neck, including the position, size, orientation, etc. of any physical features. In some implementations, the IR sensor 152 can be used as a ranging sensor. The ranging sensors can also be used to track various features of the user's head, mouth, and/or neck over time.

The structural profile, which can be based on any combination of image data from image sensors, acoustic data from acoustic sensors, thermal data from thermal sensors, and ranging data from ranging sensors. The structural profile can identify features on the user's head, including features in the user's mouth and/or throat. The structural profile can also include measured distances between any combination of features. The structural profile can be two-dimensional, three-dimensional, or a combination of both. In some implementations, thermal sensors and/or ranging sensors can be used as an alternative to the camera 404 and/or the speaker of the smart phone 404. In other implementations, thermal sensors and/or ranging sensors can be used in addition to the camera 404 and/or the speaker of the smart phone 404, in order to enhance the image data and/or the acoustic data.

Step 512 of method 500 includes causing an action to be performed in response to generating the structural profile. In some implementations, the action to be performed includes determining a risk factor. In some implementations, the risk factor is indicative of a percentage likelihood that the user 210 will develop sleep-disordered breathing and/or obstructive sleep apnea at some time in the future, and/or a percentage likelihood that the user 210 has already developed sleep-disordered breathing and/or obstructive sleep apnea. The risk factor in these implementations can include an estimated timeline for developing sleep-disordered breathing and/or obstructive sleep apnea. The risk factor can be based at least in part on the physical features of the user 210.

For example, if the analysis of the user 210 reveals that the user has a large neck circumference and a large tongue size (which can both by symptoms of obesity), the risk factor for the user 210 may indicate that the user 210 is at a higher risk for developing sleep-disordered breathing and/or obstructive sleep apnea as compared to a user with average neck circumference and tongue size. In some implementations, the risk profile can take into account additional information about the user 210 as well. This information can include demographic data such as age, gender, sex, ethnicity, location, etc. This information could also include other physiological data, such as height, weight, other medical conditions, etc. In some implementations, data from the user 210's use of system 100 can be used. For example, if the user 210 is already using a respiratory therapy device (such as respiratory therapy device 122) during their sleep sessions, method 500 can be used to determine whether the user 210's risk factor is decreasing, e.g., whether treatment with the respiratory therapy device is effective (e.g., with better sleep quality, the person may lose weight and/or require lower pressures during their use of the respiratory therapy device).

In some implementations, the action includes transmitting a notification or report to the user 210, and/or to a third party, such as a healthcare provider, a caretaker, a friend, a family member, etc. The notification or report can include information about the determined risk factor, such as the percentage likelihood that the user 210 will develop or already has developed sleep-disordered breathing and/or obstructive sleep apnea.

In other implementations, the action can include providing recommendation for therapy for the user. The therapy could be any type of therapy designed to reduce the likelihood that the user 210 will develop sleep-disordered breathing and/or obstructive sleep apnea in the future, or to reduce the severity of sleep-disordered breathing and/or obstructive sleep apnea if the user 210 has already developed sleep-disordered breathing and/or obstructive sleep apnea. The therapy can include recommending that the user 210 wear a mandibular repositioning device (which is used to aid in repositioning the user 210's upper and lower jaws), that the user begin using a respiratory therapy device (such as a positive airway pressure device), or any other suggested therapy. The recommendation for therapy could also include a suggestion that the user visit a doctor and/or a dentist for further analysis or treatment, or that the user participate in a sleep study.

In still other implementations, the action can include generating a three-dimensional model (3D) of at least a portion of the exterior of the user 210's head 214, at least a portion of the interior of the user 210's mouth 220, or both. The 3D model can be used as a template to create a customized device to aid in treating the user 210. In some implementations, the customized device is a mouth guard for the user 210 to wearing during a sleep session, which can aid in preventing events during the sleep session. In other implementations, the customized device is a customer user interface to be used with a respiratory therapy device (such as a positive airway pressure device). In additional implementations, the customized device is a mandibular repositioning device used to aid in repositioning the user 210's upper and lower jaws.

Throughout any of the steps of method 500, instructions for executing the various steps of method 500 (or other steps of other methods) can be provided. These provided instructions can include instructions for properly positioning the smart phone 402 to generate the first image data of the exterior of the user 210's head 214, to generate the second image data of the interior of the user 210's mouth 220, or to direct the acoustic signal and receive the reflected acoustic signal from the interior of the user 210's mouth 220. For example, the smart phone 402 can play audio instructions through the smart phone 402's speakers, or can display visual instructions in the smart phone 402's display. In some implementations, the smart phone 402 provides the instructions. In other implementations, other devices (such as a tablet, a laptop computer, a desktop computer, a smart speaker, etc.) can provide the instructions.

In some implementations, the instructions are designed specifically for the user 210. For example, if the smart phone 402 needs to be moved to the left relative to the user 210, the instructions can include instructions to move the smart phone 402 to the left, since the user will be holding the smart phone 402 in their hand. In still other implementations, the instructions are intended for a third party assisting the user 210 in executing the steps of method 500. Thus, referring back to the above example, the instructions to the third party may include instructions to move the phone to the third party's right. Because the third party is facing the user 210, following the instructions will result in the smart phone 402 moving in the same direction relative to the user 210. Thus, while the instructions can different depending on who they are intended for, the instructions are designed to assist in placing the phone in a desired position, or in executing any other steps.

The augmented reality indicia discussed herein in connection with step 504 can be utilized generally at any step to aid in positioning the smart phone 402. For example, the smart phone 402 can display augmented reality indicia such as the arrow 408 or the outline 410 to indicate the proper positioning of the smart phone 402 to obtain the first image data of the exterior of the user 210's head 214 and/or neck 216. The augmented reality indicia can also be used to indicate the proper positioning of the smart phone 402 to direct the acoustic signal into the interior of the user 210's mouth 220. In some implementations, the desired positions for generating the first image data (exterior of the user 210's head 214 and/or neck 216), generating the second image data (interior of the user 210's mouth 220), and directing the acoustic signal into the interior of the user 210's mouth 220 are all different. In other implementations, any two of the desired positions can be the same position. In still other implementations, all three of the desired positions are the same position.

In some implementations, additional sensors can be used to generate additional data that can be used to augment the image data and the acoustic data, to aid in generating the structural profile. These additional sensors can include a depth sensor (to perform time-of-flight processing applied to the acoustic signal or any optical signals, to aid in estimating distances outside or inside the user 210's mouth 220), a proximity sensor (to determine if the smart phone 402 has been brought close to the user's face), an infrared (IR) sensor (which could include dot matrix IR sensor in optional combination with the camera, to map the user 210's face and open mouth 220), a radio frequency (RF) sensor (such as an ultra-wideband RF (UWB-RF) sensor) to image the face and mouth 220 in 3D, a millimeter wave frequency-modulated continuous-wave (FMCW) RF sensor to image the face and mouth in 3D, or any combination thereof. These sensors can be integrated into the smart phone 402 or other handheld device, or can be part of another device. In some implementations, certain of these additional sensors can be integrated into the smart phone 402 or other handheld device, while other of the sensors are implemented on a separate device.

Generally, method 500 can be implemented using a system having a control system with one or more processors, and a memory storing machine readable instructions. The controls system can be coupled to the memory, and method 500 can be implemented when the machine readable instructions are executed by at least one of the processors of the control system. Method 500 can also be implemented using a computer program product (such as a non-transitory computer readable medium) comprising instructions that when executed by a computer, cause the computer to carry out the steps of method 500.

Figure 8:
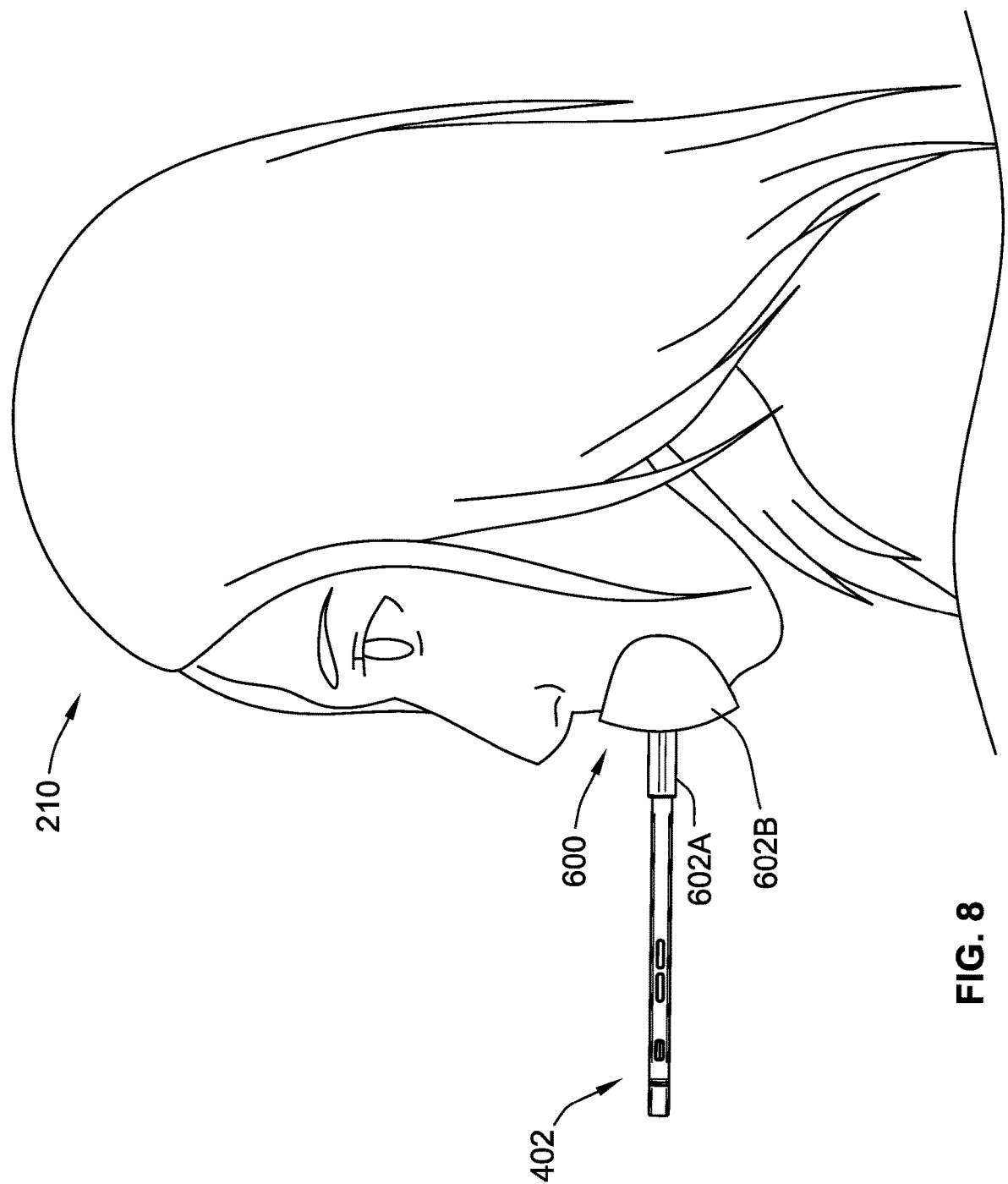
FIG. 8 is a side view of a user using a first device to hold the smart phone to generate acoustic data associated with the interior of the user's mouth.

Referring now to FIG. 8, the user 210 can use a device 600 for placing the smart phone 402 in the correct position to direct the acoustic signal into the interior of the user 210's mouth 220. As shown in FIG. 8, the smart phone 402 can be inserted into the device 600, and the user can in turn bite down on the device 600. By doing so, the acoustic sensor of the smart phone 402 is generally positioned inside the user 210's mouth 220, or just outside of the user 210's mouth 220. In this position, the smart phone 402 can use the acoustic sensor to direct an acoustic signal into the user 210's mouth 220, and receive the reflected acoustic signal that reflects off of structural features inside the user 210's mouth 220.

Figure 9A:
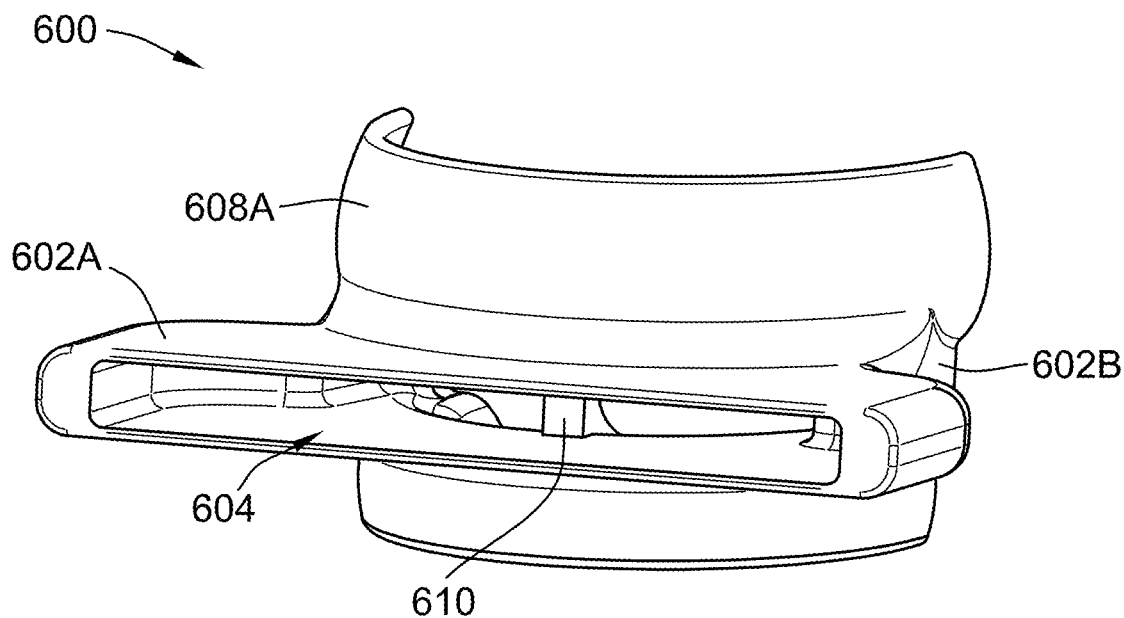
FIG. 9A is a front perspective view of the device of FIG. 8.
Figure 9B:
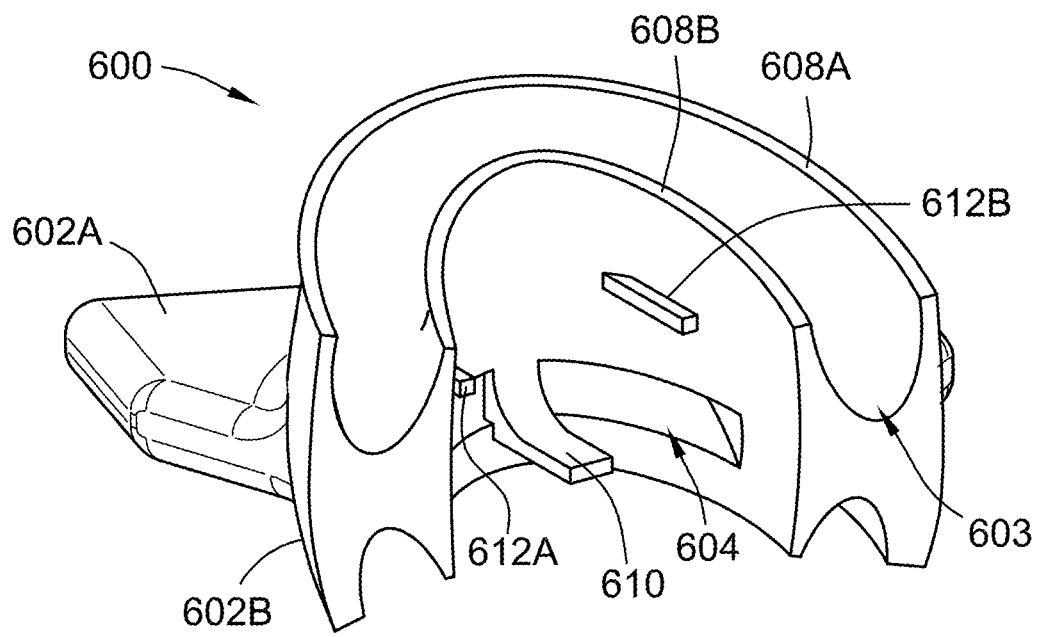
FIG. 9B is a back perspective view of the device of FIG. 8.
Figure 9C:
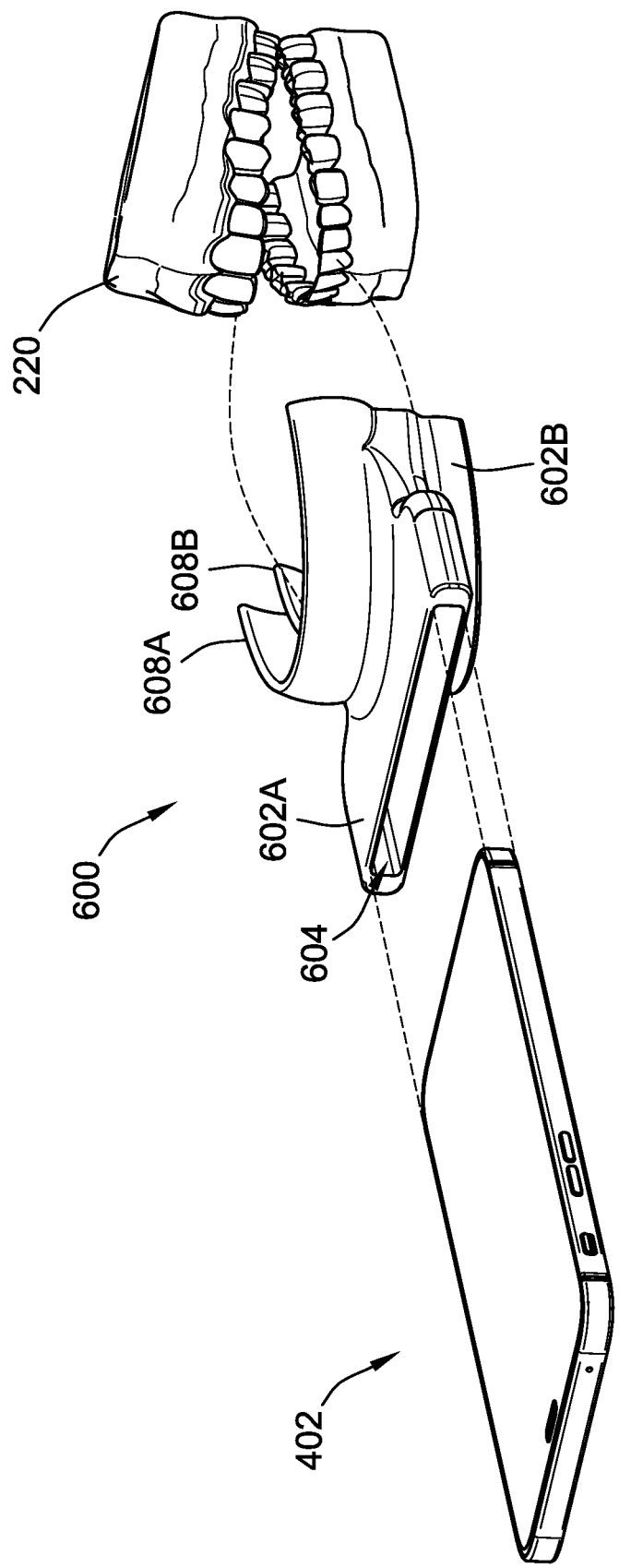
FIG. 9C is an exploded view of the device of FIG. 8, the smart phone, and the user's mouth.

Referring now to FIGS. 9A, 9B, and 9C, the device 600 is formed from a handheld device portion 602A and a mouth portion 602B. The handheld device portion 602A is configured to securely receive some or all of a handheld device, such as smart phone 402. The mouth portion 602B is configured to be grasped in the user's mouth 220, such that the smart phone 402 is positioned by the user's mouth 220. The user can bite onto the mouth portion 602B with their teeth to hold the device 600 in their mouth 220. The user can bite onto the mouth portion 602B by inserting their teeth into the groove 603 formed by the mouth portion, and either actively exerting pressure on the mouth portion 602B with their teeth or passively resting their teeth in the groove 603. The user could additionally or alternatively grip the mouth portion 602B with their gums and/or lips to hold the device 600 in their mouth 220. In some implementations, the user can grip the mouth portion 602B by inserting their gums and/or lips into the groove 603, and either actively exerting pressure on the mouth portion 602B with their gums and/or lips, or passively resting their gums and/or lips in the groove 603. As used herein, the individual's teeth can include a single tooth, multiple teeth, a portion of a single tooth, or a portion of multiple teeth. As used herein, the individual's gums can include the upper gums, the lower gums, both upper and lower gums, a portion of the upper gums, a portion of the lower gums, or a portion of both upper and lower gums. As used herein, the individual's lips can include the upper lip, the lower lip, both upper and lower lips, a portion of the upper lip, a portion of the lower lip, or a portion of both upper and lower lips.

In some implementations, the handheld device portion 602A defines a slot 604 that receives the smart phone 402. For example, FIGS. 9A, 9B, and 9C show that the handheld device portion 602A includes a top wall, a bottom wall, a first sidewall coupled to a first end of both the top wall and the bottom wall, and a second sidewall coupled to a second end of both the top wall and the bottom wall. Together, the four walls define the slot 604 that receives the smart phone 402. In other implementations, the slot 604 could be defined by fewer walls. For example, the handheld device portion 602A could include only the top wall and the bottom wall, or only the two sidewalls. In these implementations, the smart phone 402 is held in place by the two walls that form the slot 604.

When the smart phone 402 is received by the slot 604 of the handheld device portion 602A, the acoustic sensor is positioned inside the slot 604. Generally, the area within the slot 604 is open to the other side of the mouth portion 602B opposite from the handheld device portion 602A. Thus, when mouth portion 602B is inserted into the user's mouth 220, the acoustic sensor is in fluid communication with the interior of the user's mouth 220. The acoustic sensor is thus able to direct the acoustic signal into the interior of the user's mouth 220, and receive the reflected acoustic signal after it reflects off of various structures within the user's mouth 220.

Figure 10A:
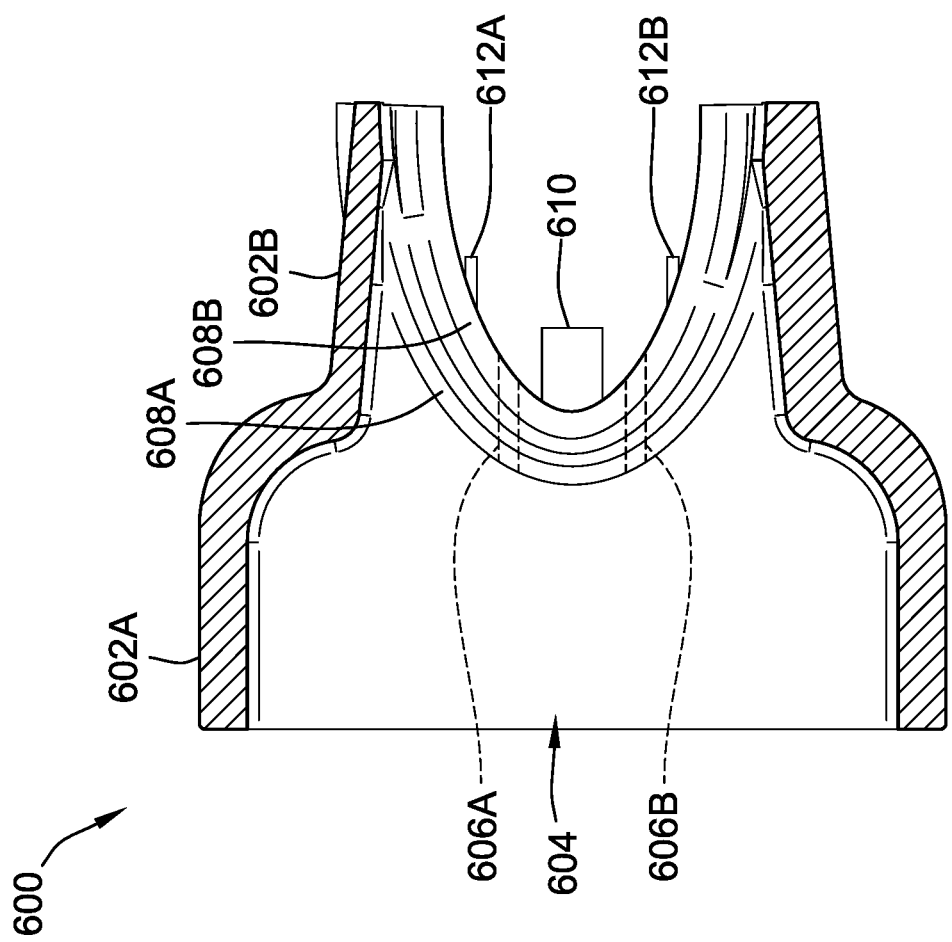
FIG. 10A is a top cross-sectional view of the device of FIG. 8.
Figure 10B:
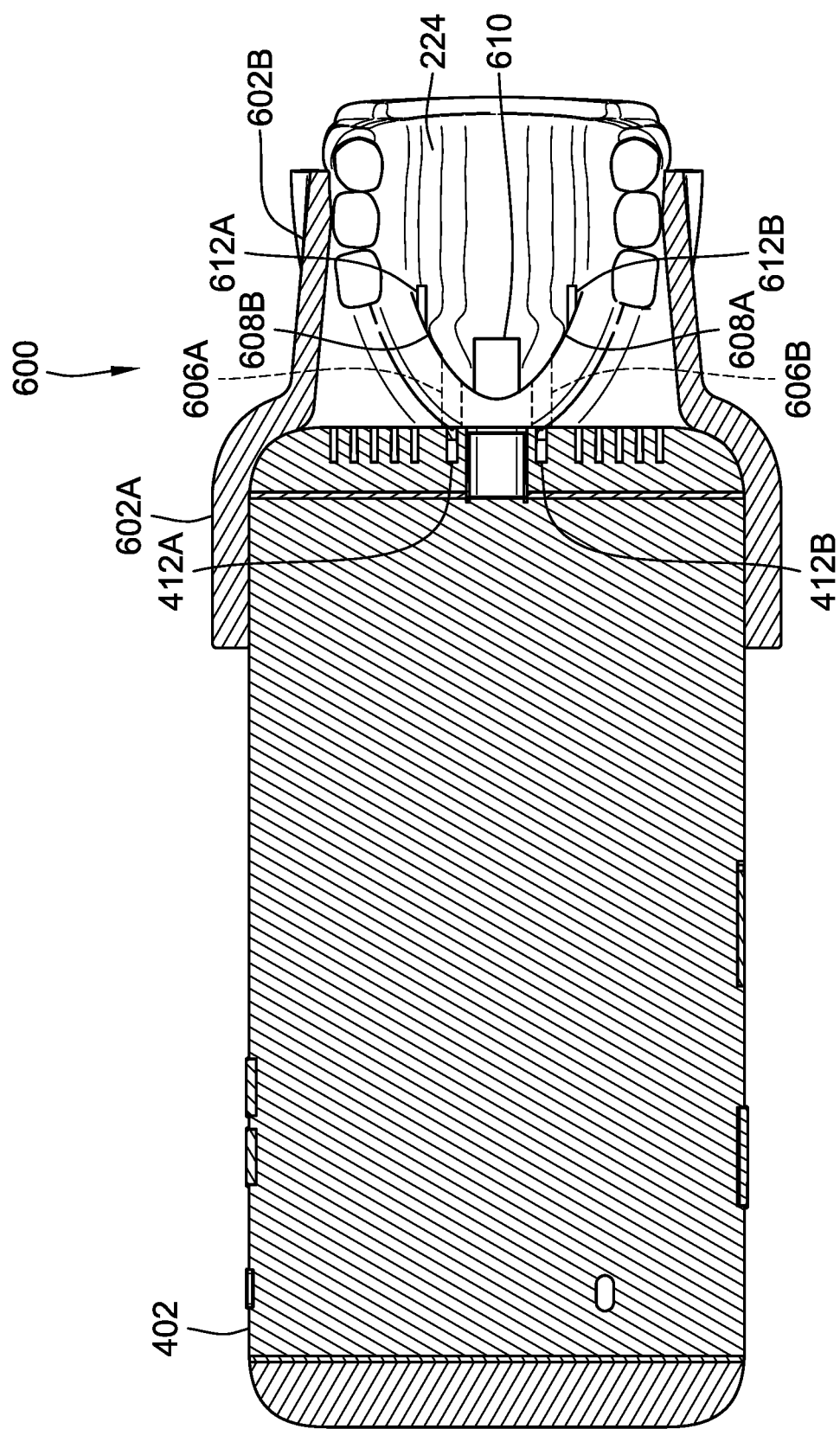
FIG. 10B is a top cross-sectional view of the device of FIG. 8 holding the smart phone.

FIG. 10A shows a top view of the device 600, while FIG. 10B shows a top view of the device 600 holding the smart phone 402. As can be seen, the mouth portion 602B has a generally curved shape that can conform to the user's teeth, gums, lips, etc. when the user grasps onto the mouth portion 602B. The mouth portion 602B is formed from an outer curved wall 608A and an inner curved wall 608B. When the user grasps the mouth portion 602B in their mouth, the inner curved wall 608B will generally be behind the user's teeth, e.g., between the user's teeth and the back of the user's mouth. The outer curved wall 608A will be placed in front of the user's teeth, so that the user's teeth are positioned between the outer curved wall 608A and the inner curved wall 608B. The user's gums and/or lips can also be positioned between the outer curved wall 608A and the inner curved wall 608B (as shown in FIG. 8), or outside of the outer curved wall 608A.

In some implementations, the outer curved wall 608A and the inner curved wall 608B define two channels 606A, 606B. The channels 606A, 606B open the interior of the slot 604 to the opposite side of the mouth portion 602B. When the smart phone 402 is inserted into the handheld device portion 602A, a speaker 412A can be positioned adjacent to channel 606A, while a microphone can be positioned adjacent to channel 606B. Channel 606A helps to direct the acoustic signal from the speaker 412A into the interior of the user's mouth, while channel 606B helps to direct the reflected acoustic signal from the interior of the user's mouth into the microphone 412B. In some implementations, the channels 606A, 606B are simply the portion or portions of the slot 604 that extend from the handheld device portion 602A to the mouth portion 602B. In other implementations, the channels 606A, 606B are separate openings defined in the device 600. The design of the mouth portion thus provides for more efficient delivery of the acoustic signal into the user's mouth, and more efficient reception of the reflected acoustic signal from the user's mouth. In implementations, the area of the outer curved wall 608A can be shaped to aid in collected the reflected acoustic signal. For example, the outer curved wall 608A could include a cone-shaped projection that helps to more efficiently collect the reflected acoustic signal.

In some implementations, device 600 includes a tongue depressor 610. The tongue depressor extends inwardly from the inner curved wall 608B toward the back of the user's mouth. When the user inserted the mouth portion 602B into their mouth and bites down, the tongue depressor 610 is positioned on top of the user's tongue. The tongue depressor 610 prevents the user's tongue from moving upward while the speaker 412A is emitting the acoustic signal and the microphone 412B is receiving the reflected acoustic signal. The tongue depressor 610 thus aids in preventing the user's tongue from blocking the acoustic signal emitted by the speaker 412A, and in preventing the user's tongue from blocking the reflected acoustic signal.

In implementations where the channels 606A, 606B are defined by the slot 604, the tongue depressor 610 can also act as a blocking structure that prevents the acoustic signal emitted by the speaker 412A from being received directly by the microphone 412B, and ensures that the acoustic signal reflects off of one or more physical structures of the user 210's mouth 220 prior to being received by the microphone 412B. In implementations where the channels 606A, 606B are separate defined through the device 600, the portion of the device 600 (which could be from the outer curved wall 608A, the inner curved wall 608B, or any other portion) positioned between the channels 606A, 606B acts as the blocking structure prevents the acoustic signal emitted by the speaker 412A from being received directly by the microphone 412B, and ensures that the acoustic signal reflects off of one or more physical structures of the user 210's mouth 220 prior to being received by the microphone 412B.

The device 600 can also include calibration markers 612A, 612B. The calibration markers 612A, 612B are configured to aid in determining the positions of the various features within the user's mouth. Both of the calibration makers 612A, 612B extend away from the device 600 a known distance, and the calibration makers 612A, 612B are positioned a known distance apart from each other. Thus, when analyzing the reflected acoustic signal, any portions of the acoustic signal associated with reflections off of the calibration markers 612A, 612B can serve as a reference in determining other distances and positions, since the positions of the calibration makers 612A, 612B relative to both each other and to the inner curved wall 608 are known. In some implementations, device 600 can include only a single calibration maker. In other implementations, device 600 can include three or more calibration makers.

Figure 11:
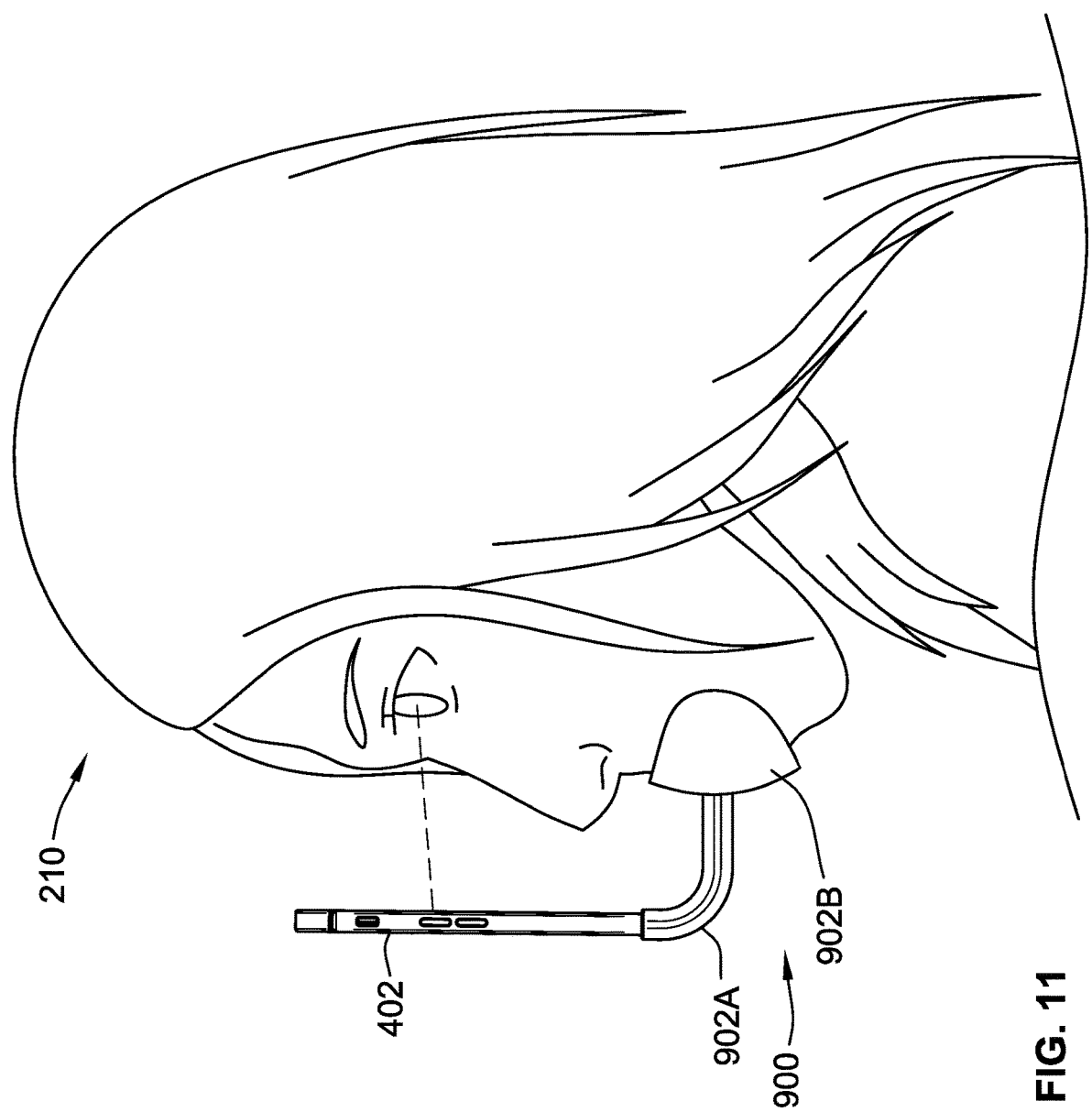
FIG. 11 is a side view of a user using a second device to hold the smart phone to generate image data associated with the exterior of the user's head and/or neck, and acoustic data associated with the interior of the user's mouth.

FIG. 11 illustrates a device 900 for holding the smart phone 402. Device 900 is similar to device 600, and includes a handheld device portion 902A and a mouth portion 902B. Handheld device portion 902A securely receives the smart phone 402, while mouth portion 902B is inserted into the user 210's mouth. However, in this implementation, the handheld device portion 902A is angled at about 90°, such that the smart phone 402 is held vertically in front of the user 210's face. The device 900 thus holds the smart phone 402 in a position where the smart phone 402 can generate the first image data of the exterior of the user 210's head, using the smart phone's camera. However, because the end of the smart phone 402 with the speaker and microphone are inserted into the slot defined by the handheld device portion 902A, the speaker and microphone of the smart phone 402 are in fluid communication with the interior of the user 210's mouth in this position. The speaker can thus direct the acoustic signal into the user 210's mouth while the microphone receives the reflected acoustic signal, at the same time that a camera of the smart phone 402 is obtaining the first image data.

FIGS. 12A-13B illustrate a device 1000 for holding the smart phone 402 that has the camera 404, speaker 412A, and microphone 412B all located on one end of the smart phone 402. Device 1000 is similar to device 900. However, device 1000 is configured to hold the smart phone 402 in an orientation such that the interior of the user's mouth 220 is in the field of view of the camera 404, and such that both the speaker 412A and the microphone 412B are in fluid communication with the interior of the user's mouth 220.

The device 1000 includes a front wall 1004A and a back wall 1004B that define an opening configured to receive the smart phone 402. The device 1000 also includes an outer curved wall 1008A and an inner curved wall 1008B that are in contact with the user's mouth 220. In the illustrated implementation, the user bites down onto the device 1000, such that the user's teeth 224 are positioned between the outer curved wall 1008A and the inner curved wall 1008B.

Figure 12A:
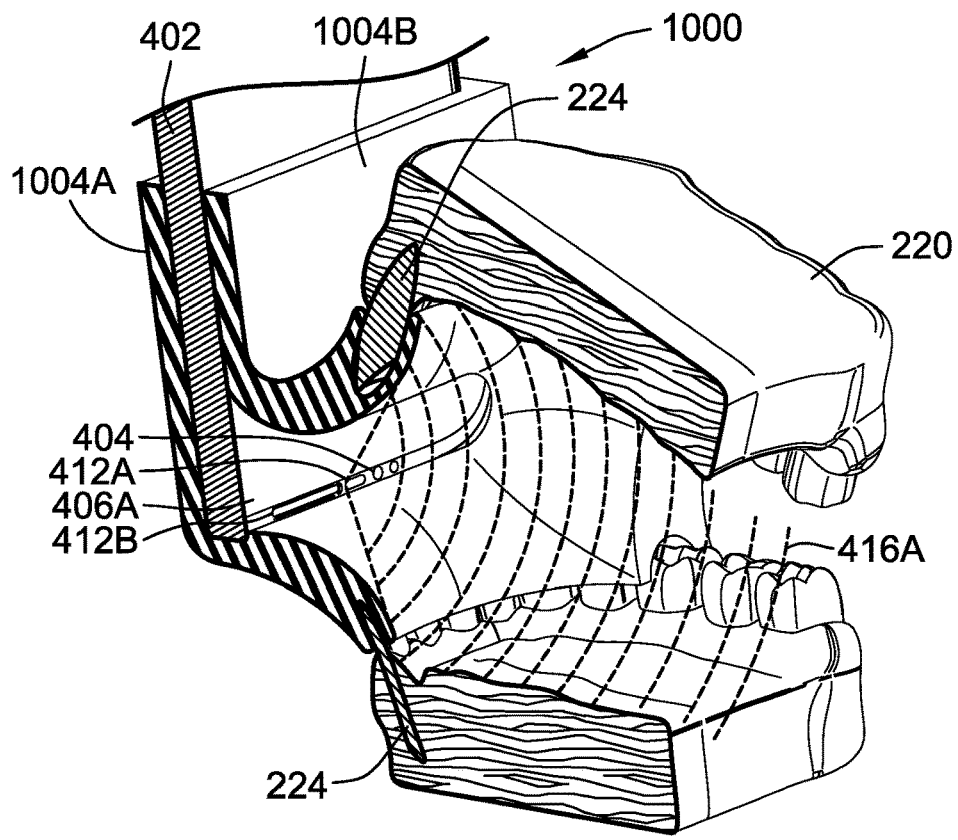
FIG. 12A is a perspective cross-section view of a user biting a third device to hold the smart phone as the smart phone emits an acoustic signal into the user's mouth.
Figure 12B:
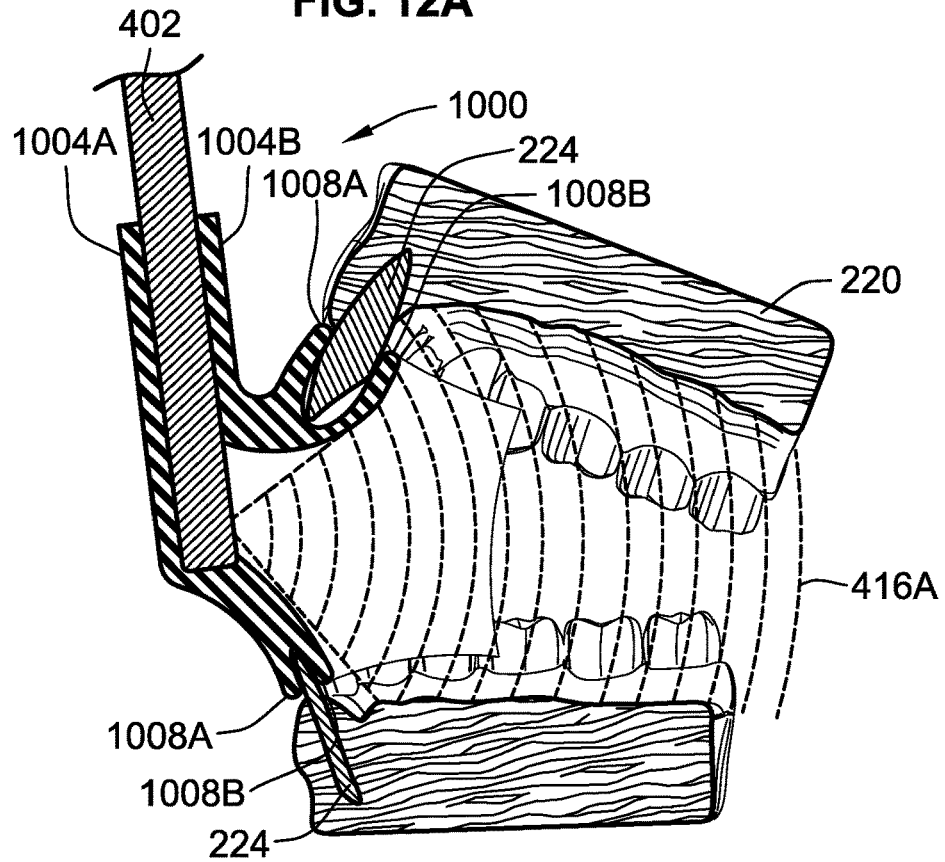
FIG. 12B is a side cross-section view of the user biting the device of FIG. 12A as the smart phone emits an acoustic signal into the user's mouth.
Figure 13A:
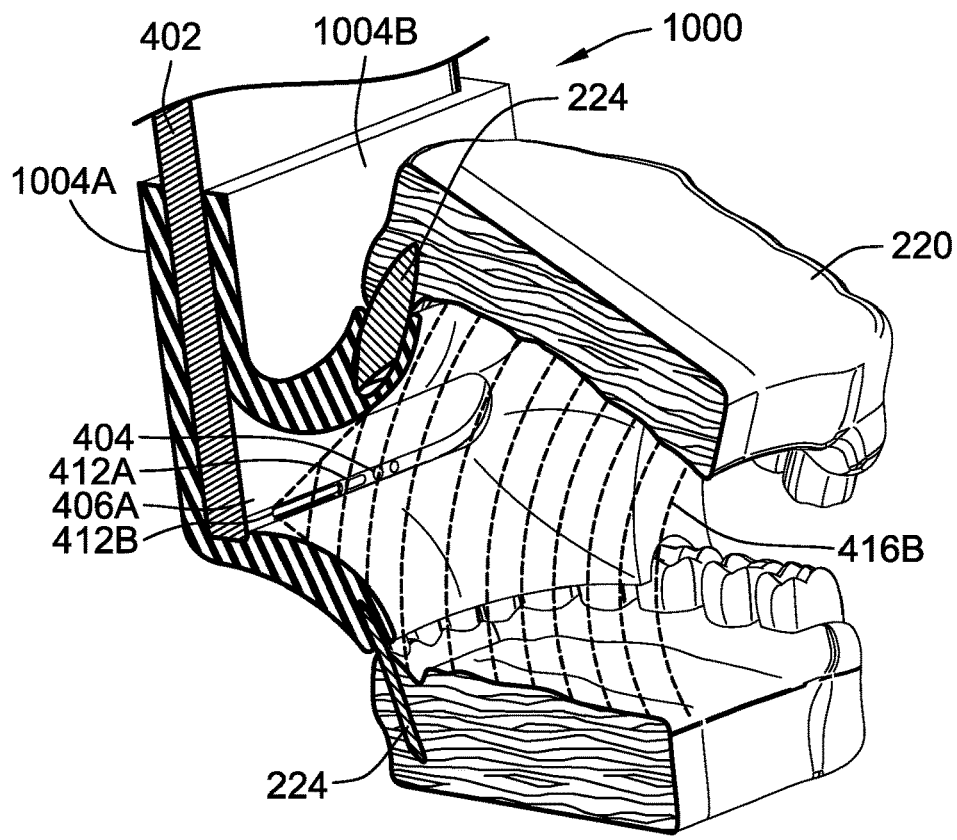
FIG. 13A is a perspective cross-section view of the user biting the device of FIG. 12A as the smart phone receives a reflected acoustic signal from the user's mouth.
Figure 13B:
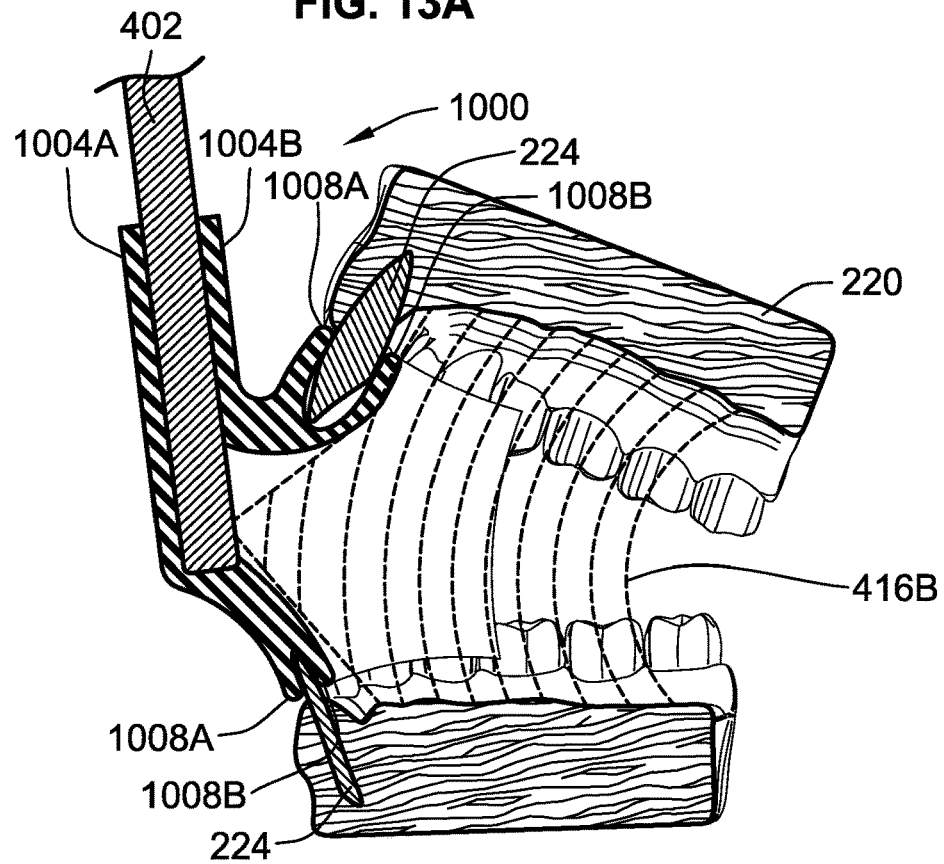
FIG. 13B is a side cross-section view of the user biting the device of FIG. 12A as the smart phone receives a reflected acoustic signal from the user's mouth.

The opening in device 1000 that is defined between the front wall 1004A and the back wall 1004B opens into the interior of the user's mouth 220. Thus, as shown in FIGS. 12A and 12B, the speaker 412A can emit an acoustic signal (represented by sound waves 416A) that propagates into the interior of the user's mouth 220. At the same time, the camera 404 of the smart phone 402 can generate image data reproducible as an image of the interior of the user's mouth 220. Additionally, because the smart phone 402 extends into the opening defined between the front wall 1004A and the back wall 1004B, the first portion 406A of the display of the smart phone 402 is positioned adjacent to the interior of the user's mouth 220. The first portion 406A of the display of the smart phone 402 can be used to illuminate the interior of the user's mouth 220, and generate higher-quality image data. When the acoustic signal (represented by the sound waves 416A) is emitted by the speaker 412A, the acoustic signal reflects off of various structures or features within the user's mouth 220. The reflected acoustic signal (represented by sound waves 416B) propagates back to the smart phone 402, where it is received by the microphone 412B.

While the disclosure herein generally refers to a smart phone, any device or combination of devices can be used to carry out the steps of method 500, and in general to capture image and acoustic data from the user. For example, the user 210 could use a tablet, a laptop computer, a desktop computer, other devices, or any combination thereof to obtain the image data and the acoustic data, and to generate the structural profile. In some implementations, the handheld device is used to obtain the image data and acoustic data, but an external device (such as user device 170) is used to perform some or all of the processing of the data to generate the structural profile.

In some implementations, the device used to hold the smart phone 402 is configured to allow for controlled use of the camera 404 to generate the image data. For example, the device could include a shutter configured to selectively block and unblock the camera 404, so that the camera 404 only generates image data when desired. The device can also include calibration makers for use with the camera 404 to provide a positional reference in the image data. The calibration markers could be the same calibration makers 612A, 612B used with the acoustic sensor, or could be additional or alternative calibration markers. In some implementations, the portions of the device defining the slot may extend the length of the smart phone 402, such that all or nearly all of the smart phone 402, including the camera 404, is disposed in the slot. The shutter could be built into the portions of the device defining the slot, to thereby block and unblock the camera 404.

The handheld device (such as the smart phone 402) and the device for receiving the handheld device (such as device 600, device 900, or device 600) can form a system used to analyze physical features of the user's mouth, throat, neck, head, etc. By using the device that the user can partially insert into their own mouth, the user can obtain more accurate measurements, analysis, etc. of their own physical features. By inserting the handheld device into the device that is partially inserted into the user's mouth, the user can achieve consistent positioning of the handheld device, and avoid any incorrect positioning that may produce inaccurate measurements and analysis.

One or more elements or aspects or steps, or any portion(s) thereof, from one or more of any of the claims below can be combined with one or more elements or aspects or steps, or any portion(s) thereof, from one or more of any of the other claims below or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method of analyzing physical features of an individual, the method comprising:
    directing, using an acoustic sensor of a handheld device, an acoustic signal toward a mouth of the individual, the acoustic signal being configured to reflect off at least a portion of an interior of the mouth of the individual;
    receiving, using the acoustic sensor, a reflected acoustic signal from the interior of the mouth of the individual, the reflected acoustic signal being indicative of structural characteristics of the mouth of the individual;
    based at least in part on the reflected acoustic signal, generating a structural profile of at least the interior of the mouth of the individual;
    in response to generating the structural profile, determining a risk factor that the individual has sleep-disordered breathing, will develop sleep-disordered breathing, or both; and
    based at least in part on the structural profile, generating a recommendation for a type of therapy for the individual, wherein the recommendation for the type of therapy includes a recommendation to use a mandibular repositioning device, a recommendation to use a respiratory therapy device, or both.

2. The method of claim 1, further comprising:
    generating, using one or more image sensors of the handheld device, first image data reproducible as an image of at least a portion of an exterior of a head of the individual, a neck of the individual, or both the head and the neck of the individual; and
    generating, using the one or more image sensors, second image data reproducible as an image of at least a portion of the interior of the mouth of the individual, wherein the structural profile further includes at least a portion of the head of the individual, at least a portion of the neck of the individual, or at least the portion of the head of the individual and at least the portion of the neck of the individual, and is further based at least in part on the first image data, the second image data, or both the first image data and the second image data.

3. The method of claim 2, wherein the method further comprises:
    displaying, on at least a first portion of a display of the handheld device, a real-time view of the individual based on the first image data, the second image data, or both; and
    illuminating, using at least a second portion of the display of the handheld device, at least a portion of the individual, such that the display of the handheld device is simultaneously used to display the real-time view of the individual and to illuminate the individual.

4. The method of claim 3, further comprising displaying, on the first portion of the display of the handheld device, one or more augmented reality (AR) indicia configured to aid in directing the handheld device to a desired position to (i) generate the first image data, (ii) generate the second image data, (iii) direct the acoustic signal toward the mouth of the individual, or (iv) any combination of (i)-(iii).

5. The method of claim 4, wherein the one or more AR indicia include at least one marker configured to indicate a direction for the handheld device to move toward the desired position.

6. The method of claim 4, wherein the one or more AR indicia include at least one outline configured to be overlaid with the real-time view of a feature of the individual on the first portion of the display when the handheld device is in the desired position.

7. The method of claim 6, wherein the at least one outline has a shape corresponding to the shape of the feature of the individual.

8. The method of claim 4, wherein the handheld device is configured to indicate when the handheld device is in the desired position.

9. The method of claim 8, wherein in response to the handheld device being in the desired position, the handheld device is configured to (i) display an indicator on the display of the handheld device, (ii) generate an audible sound, (iii) modify the one or more AR indicia, or (iv) any combination of (i)-(iii).

10. The method of claim 8, wherein in response to the handheld device being in the desired position, the handheld device is configured to (i) change a color of at least one of the one or more AR indicia, (ii) change a shape of the at least one of the one or more AR indicia, (iii) change a size of the at least one of the one or more AR indicia, or (iv) any combination of (i)-(iii).

11. The method of claim 4, wherein the desired position to generate the first image data is different than the desired position to generate the second image data and to direct the acoustic signal toward the mouth of the individual, and wherein the desired position to generate the second image data is identical to the desired position to direct the acoustic signal toward the mouth of the individual.

12. The method of claim 2, further comprising providing instructions, the provided instructions including at least instructions for positioning (i) the one or more image sensors to generate the first image data, (ii) the one or more image sensors to generate the second image data, (iii) the acoustic sensor for directing the acoustic signal toward the mouth of the individual, or (iv) any combination of (i)-(iii).

13. The method of claim 12, wherein the handheld device is configured to provide the instructions.

14. The method of claim 12, wherein the instructions are configured to indicate a direction in which to move the handheld device to position the acoustic sensor for directing the acoustic signal toward the mouth of the individual.

15. The method of claim 2, wherein the handheld device is configured to generate an audible sound configured to aid in directing the handheld device to a desired first position to (i) generate the second image data, (ii) direct the acoustic signal toward the mouth of the individual, or (iii) any combination of (i) and (ii).

16. The method of claim 15, wherein the handheld device is configured to modify a characteristic of the audible sound based on a distance of the handheld device from the first position.

17. The method of claim 16, wherein the handheld device is configured to (i) increase or decrease the volume of the audible sound in response to the handheld device being moved closer to the first position, (ii) increase or decrease the pitch of the audible sound in response to the handheld device being moved closer to the first position, (iii) increase or decrease a repetition rate of the audible sound in response to the handheld device being moved closer to the first position, or (iv) any combination of (i)-(iii).

18. The method of claim 2, wherein the method further comprises displaying, on an external display separate from the handheld device, a real-time view of the individual based on the first image data, the second image data, or both the first image data and the second image data, to thereby aid in positioning the handheld device to (i) generate the first image data, (ii) generate the second image data, (iii) direct the acoustic signal toward the mouth of the individual, or (iv) any combination of (i)-(iii).

19. The method of claim 1, further comprising generating a three-dimensional (3D) model of at least the interior of the mouth of the individual based at least in part on the reflected acoustic signal, the 3D model configured to be used as a template for creating a customized mandibular repositioning device or a customized user interface to use with the respiratory therapy device.

20. A system for analyzing physical features of an individual, the system comprising:
 a memory having stored thereon machine-readable instructions; and
 a control system coupled to the memory, the control system including one or more processors to execute the machine-readable instructions to:
  direct an acoustic signal toward a mouth of the individual, the acoustic signal being configured to reflect off at least a portion of an interior of the mouth of the individual;
  receive a reflected acoustic signal from the interior of the mouth of the individual, the reflected acoustic signal being indicative of structural characteristics of the mouth of the individual;
  based at least in part on the reflected acoustic signal, generate a structural profile of at least the interior of the mouth of the individual;
  in response to generating the structural profile, determining a risk factor that the individual has sleep-disordered breathing, will develop sleep-disordered breathing, or both; and
  based at least in part on the structural profile, generating a recommendation for a type of therapy for the individual, wherein the recommendation for the type of therapy includes a recommendation to use a mandibular repositioning device, a recommendation to use a respiratory therapy device, or both.

* * * * *